United States Patent
Wang et al.

(10) Patent No.: US 12,079,118 B2
(45) Date of Patent: Sep. 3, 2024

(54) METHOD AND ELECTRONIC DEVICE TO RECLAIM PHYSICAL PAGE USING ACTIVE AND INACTIVE LISTS

(71) Applicant: Honor Device Co., Ltd., Shenzhen (CN)

(72) Inventors: Tao Wang, Shenzhen (CN); Qi Zhai, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/768,655

(22) PCT Filed: Nov. 2, 2020

(86) PCT No.: PCT/CN2020/125947
§ 371 (c)(1),
(2) Date: Apr. 13, 2022

(87) PCT Pub. No.: WO2021/093626
PCT Pub. Date: May 20, 2021

(65) Prior Publication Data
US 2024/0111666 A1    Apr. 4, 2024

(30) Foreign Application Priority Data

Nov. 15, 2019  (CN) .......................... 201911118935.9

(51) Int. Cl.
*G06F 12/02*   (2006.01)
(52) U.S. Cl.
CPC .................................. *G06F 12/023* (2013.01)
(58) Field of Classification Search
CPC .................................................. G06F 12/023
See application file for complete search history.

(56) References Cited

U.S. PATENT DOCUMENTS

| | | |
|---|---|---|
| 7,337,296 B2 | 2/2008 | Noel et al. |
| 9,104,636 B2 | 8/2015 | Nonogaki |

(Continued)

FOREIGN PATENT DOCUMENTS

| | | |
|---|---|---|
| CN | 103150259 A | 6/2013 |
| CN | 104008061 A | 8/2014 |

(Continued)

OTHER PUBLICATIONS

Mu, A., "Linux kernel memory reclamation logic and algorithm (LRU)"; Retrieved from the internet: https://www.cnblogs.com/muahao/p/10109712.html, Dec. 12, 2018, 6 pages. With English Abstract.

(Continued)

*Primary Examiner* — Chie Yew
(74) *Attorney, Agent, or Firm* — Conley Rose, P.C.

(57) ABSTRACT

A memory management method and an electronic device are disclosed, which are related to the field of electronic device technologies, so as to avoid unnecessary reclaim and check of a frequently accessed physical page for many times, accelerate reclaim efficiency of an operating system on a physical page, and improve the performance of the operating system. The method specifically includes: using, by an electronic device, a plurality of inactive lists and one active list for each memory zone to implement a function of reclaiming a physical page; or using one inactive list and a plurality of active list for each memory zone to implement the function of reclaiming the physical page; or using a plurality of inactive lists and a plurality of active list for each memory zone to implement the function of reclaiming the physical page.

20 Claims, 6 Drawing Sheets

(56) References Cited

U.S. PATENT DOCUMENTS

| | | | |
|---|---|---|---|
| 2005/0262325 A1 | 11/2005 | Shmueli et al. | |
| 2010/0312955 A1* | 12/2010 | Hwang | G06F 12/121 |
| | | | 711/E12.001 |
| 2011/0283049 A1 | 11/2011 | Kang et al. | |
| 2012/0221771 A1 | 8/2012 | Yoon et al. | |
| 2013/0282967 A1* | 10/2013 | Ramanujan | G06F 12/0246 |
| | | | 711/114 |
| 2015/0169237 A1 | 6/2015 | Ioannou et al. | |
| 2015/0317246 A1 | 11/2015 | Xia et al. | |
| 2017/0344300 A1* | 11/2017 | Chang | G06F 12/1009 |
| 2019/0220418 A1 | 7/2019 | Chen et al. | |

FOREIGN PATENT DOCUMENTS

| | | |
|---|---|---|
| CN | 106843756 A | 6/2017 |
| CN | 106970882 A | 7/2017 |
| CN | 107817945 A | 3/2018 |
| CN | 108205475 A | 6/2018 |
| CN | 108205501 A | 6/2018 |
| CN | 108228339 A | 6/2018 |
| CN | 109690485 A | 4/2019 |

OTHER PUBLICATIONS

Xu, J., et al., "SA-PFRS: Semantics-Aware Page Frame Reclamation System in Virtualized Environments"; 2017 IEEE 23rd International Conference on Parallel and Distributed Systems Aug. 31, 2018, 10 pages.

Jiang, L., "Linux Memory Management Analysis and Research," University of Electronic Science and Technology of China, Dec. 15, 2021, 78 pages.

Wei, S., "On Object-based Reverse Mapping," Research and Exploration in Laboratory, vol. 32, No. 1, Jan. 15, 2013, 3 pages. With English abstract.

* cited by examiner

METHOD AND ELECTRONIC DEVICE TO RECLAIM PHYSICAL PAGE USING ACTIVE AND INACTIVE LISTS

This application is a U.S. National Stage of International Application No. PCT/CN2020/125947 filed on Nov. 2, 2020, which claims priority to Chinese Patent Application No. 201911118935.9, filed with the China National Intellectual Property Administration on Nov. 15, 2019, both of which are incorporated herein by reference in their entireties.

TECHNICAL FIELD

This application relates to the field of electronic device technologies, and in particular, to a memory management method and an electronic device.

BACKGROUND

As a technology of memory management in an operating system of an electronic device, virtual memory (virtual memory) is an abstraction of a memory (also referred to as physical memory) provided by the operating system. The virtual memory is implemented by a combination of operating system software and hardware. The virtual memory may not be limited by a size of the memory, providing a larger private address space for applications. That is, each application process independently allocates its own virtual memory space. The operating system allocates a physical memory space (that is, physical pages) for the virtual memory space of the application, that is, maps the virtual memory space allocated by the application process to the physical pages.

When an application reads and writes files, the operating system uses physical pages as a cache of the files stored in an external memory to improve the reading and writing performance of the operating system. Because the quantity of physical pages of the electronic device is limited, when the application process runs for a long time and does not actively release physical pages, or when a large quantity of application processes apply for physical pages, there are fewer idle physical pages. Therefore, when the quantity of idle physical pages cannot meet a requirement for memory allocation or fall below a certain threshold, the operating system will reclaim recently unused physical pages based on a certain algorithm (for example, a least recently used (least recently used, LRU) algorithm).

Using Linux as an example, the operating system uses a pair of LRU lists to maintain physical pages of a memory. The LRU list includes an active list (active_list) and an inactive list (inactive_list). Frequently accessed physical pages in an active state are put in the active_list, while infrequently accessed physical pages are put in the inactive_list. When reclaiming physical pages, the operating system scans from the tail of the inactive_list and checks whether each physical page has been used recently. If a physical page has been used, the physical page is put at the head of the active_list. If a physical page has not been used, the physical page is reclaimed. That is, when moving from the head of the active_list to the tail of the inactive_list, a physical page will be reclaimed by the operating system if it has not been accessed.

It may be noted that in an existing method for reclaiming a physical page, only whether the physical page has been used recently is considered without considering the quantity of times the physical page is actually used, which will affect the reading and writing performance of the operating system. For example, some shared physical pages are actually frequently accessed by a plurality of application processes, but an access period of one shared physical page may be longer than the time it takes for the shared physical page to move from the head of the active_list to the tail of the inactive_list. In this case, when the operating system reclaims physical pages, the shared physical pages will still be reclaimed. When the application processes access the shared physical pages again, the operating system will reallocate the physical pages. It can be learned that these shared physical pages are always reclaimed and reallocated by the operating system repeatedly, which will seriously affect the reading and writing performance of the operating system.

SUMMARY

This application provides a memory management method and an electronic device, which avoid unnecessary reclaim and check of a frequently accessed physical page for many times, accelerate reclaim efficiency of an operating system on a physical page, and improve the performance of the operating system.

To achieve the foregoing objective, embodiments of this application provide the following technical solutions:

According to a first aspect, a memory management method is provided, where the method is applied to an electronic device, a memory of the electronic device includes one or more memory zones, and each of the one or more memory zones is corresponding to n inactive lists and m active lists, where n is an integer greater than 1, and m is an integer greater than or equal to 1. The method includes: The electronic device puts each of inactive physical pages allocated by the memory into a corresponding inactive list among the n inactive lists based on the quantity of mappings to the inactive physical page by application processes; in the process of reclaiming physical pages of the memory by the electronic device, the electronic device scans each of the n inactive lists, and performs reclaim check on physical pages in each scanned inactive list, where a larger quantity of mappings to the physical page in the inactive list by the application processes indicates a longer scanning cycle corresponding to the inactive list; and if it is checked that physical pages in the n inactive lists have not been accessed in a recent preset period, the electronic device reclaims the physical pages; or if it is checked that physical pages in the n inactive lists have been accessed in the recent preset period, the electronic device moves the physical pages to the m active lists.

For example, the electronic device may put physical pages in different inactive_lists based on values of mapcount of the physical pages. The mapcount of a physical page is used to indicate the quantity of mappings of the physical page by application processes, that is, the quantity of application process page table entries (page table entries, PTEs) mapped based on the physical page, that is, the quantity of application processes sharing the physical page. It may be considered that when a physical page is shared by more application processes, the probability that the physical page is frequently accessed is higher.

On one hand, this reduces reclaim check of a frequently accessed physical page, reduces the probability that the physical page is reclaimed, and prolongs the survival time of the frequently accessed physical page, thereby increasing the cache hit rate of the memory of the operating system. On the other hand, performing reclaim check on the frequently accessed physical page by using a larger cycle is conducive to finding during the reclaim check that the physical page has been accessed within the recent first preset period, so that the physical page is moved from the inactive_list to the active_list, and the survival time of the frequently accessed physical page is prolonged, thereby increasing the cache hit rate of the memory of the operating system.

In a possible implementation, that the electronic device scans each of the n inactive lists includes: The electronic device sequences the n inactive lists based on the quantity of mappings to each physical page by the application processes; and in the process of reclaiming the physical pages of the memory by the electronic device, the electronic device performs P rounds of scanning on the n inactive lists, where P is an integer greater than or equal to 2, where in each of the P rounds of scanning, based on the sequence of the n inactive lists, the electronic device scans from the inactive list in which the physical page with the smallest quantity of mappings by the application processes is located, and the quantity of inactive lists scanned in each round is different. Therefore, a method for scanning each of the n inactive lists by using different cycles is provided.

In a possible implementation, that in each of the P rounds of scanning, based on the sequence of the n inactive lists, the electronic device scans from the inactive list in which the physical page with the smallest quantity of mappings by the application processes is located, and the quantity of inactive lists scanned in each round is different is specifically as follows: In each of the P rounds of scanning, based on the sequence of the n inactive lists, the electronic device scans from the inactive list in which the physical page with the smallest quantity of mappings by the application processes is located, and the quantity of inactive lists scanned in each round increases by a preset quantity compared with the quantity of inactive lists scanned in the previous round.

In a possible implementation, the method further includes: When m is equal to 1, in the process of reclaiming the physical pages of the memory by the electronic device, the electronic device scans from one side of the active list, and performs reclaim check on scanned physical pages; and if it is checked that a physical page in the active list has not been accessed in the recent preset period, the electronic device puts the physical page into the inactive list corresponding to the quantity of mappings to the physical page by the application processes; or if it is checked that a physical page in the inactive list has been accessed in the recent preset period, the electronic device moves the physical page to the other side of the active list. Therefore, a method for processing scanned physical pages in the inactive list is provided.

In a possible implementation, the method further includes: When m is greater than 1, the electronic device puts each of active physical pages allocated by the memory into a corresponding active list among the m active lists based on the quantity of times the physical page is accessed.

For example, the electronic device can determine whether each physical page has been accessed within the recent first preset period based on a PG_referenced flag of the physical page, and determine how frequently the physical page is accessed with reference to an identifier (used to identify different active_lists) of the active_list in which the physical page is located.

Based on the principle of locality, it can be learned that when a CPU accesses the memory, accessed memory units tend to gather in a relatively small continuous zone, no matter whether the CPU accesses instructions or accesses data. That is, a frequently accessed physical page is usually accessed again, so that it is meaningless and wasteful to repeatedly perform reclaim check on the frequently accessed physical page. However, in this application, reclaim check is performed on the frequently accessed physical page by using a longer cycle, which can avoid unnecessary reclaim check on processes of the operating system and improve the reading and writing performance of the operating system.

In a possible implementation, that if it is checked that physical pages in the n inactive lists have been accessed in the recent preset period, the electronic device moves the physical pages to the m active lists specifically includes: If it is checked that physical pages in the n inactive lists have been accessed in the recent preset period, the electronic device moves the physical pages to the active list with the physical page accessed the smallest quantity of times among the m active lists. Therefore, another method for processing scanned physical pages in the inactive list is provided.

In a possible implementation, the method further includes: In the process of reclaiming the physical pages of the memory by the electronic device, the electronic device scans the m active lists, and performs reclaim check on physical pages in the m scanned active lists; if it is checked that physical pages in the m active lists have not been accessed in the recent preset period, the electronic device puts each of the physical pages into the inactive list corresponding to the quantity of mappings to the physical page by the application processes; and if it is checked that a physical page in the first active list among the m active lists has been accessed in the recent preset period, the electronic device moves the physical page to the second active list among the m active lists, where the quantity of times the physical page in the second active list is accessed is greater than the quantity of times the physical page in the first active list is accessed. Therefore, a method for processing scanned physical pages in the active list is provided.

In a possible implementation, that the electronic device scans the m active lists includes: In the process of the reclaiming physical pages of the memory by the electronic device, the electronic device performs Q rounds of scanning on the m active lists, where Q is an integer greater than or equal to 2, where in each of the Q rounds of scanning, based on the sequence of the m active lists, the electronic device scans from the active list in which the physical page accessed the smallest quantity of times is located, and the quantity of active lists scanned in each round is different. Therefore, a method for scanning each of the m active lists by using different cycles is provided.

In a possible implementation, that in each of the Q rounds of scanning, based on the sequence of the m active lists, the electronic device scans from the active list in which the physical page accessed the smallest quantity of times is located, and the quantity of active lists scanned in each round is different is specifically as follows: In each of the Q rounds of scanning, based on the sequence of the m active lists, the electronic device scans from the active list in which the physical page accessed the smallest quantity of times is located, and the quantity of active lists scanned in each round increases by a preset quantity compared with the quantity of active lists scanned in the previous round.

According to a second aspect, a memory management method is provided, where the method is applied to an electronic device, a memory of the electronic device includes one or more memory zones, and each of the one or more memory zones is corresponding to one inactive list and m active lists, and m is an integer greater than 1. The method includes: The electronic device puts each of active physical pages allocated by the memory into a corresponding active list among the m active lists based on the quantity of times the physical page is accessed; in the process of reclaiming physical pages of the memory by the electronic device, the electronic device scans each of the m active lists, and performs reclaim check on physical pages in each of the m scanned active lists, where a larger quantity of time the physical page in the active list is accessed indicates a longer scanning cycle corresponding to the active list; if it is checked that physical pages in the m active list have not been accessed in the recent preset period, the electronic device moves the physical pages to one side of the inactive list; and if it is checked that a physical page in the first active list among the m active lists has been accessed in the recent preset period, the electronic device moves the physical page to the second active list among the m active lists, where the quantity of times the physical page in the second active list is accessed is greater than the quantity of times the physical page in the first active list is accessed.

It can be learned that a frequently accessed physical page is usually accessed again, so that it is meaningless and wasteful to repeatedly perform reclaim check on the frequently accessed physical page. However, in this application, reclaim check is performed on the frequently accessed physical page by using a longer cycle, which can avoid unnecessary reclaim check on processes of the operating system and improve the reading and writing performance of the operating system.

In a possible implementation, that the electronic device scans each of the m active lists includes: In the process of the reclaiming physical pages of the memory by the electronic device, the electronic device performs Q rounds of scanning on the m active lists, where Q is an integer greater than or equal to 2, where in each of the Q rounds of scanning, based on the sequence of the m active lists, the electronic device scans from the active list in which the physical page accessed the smallest quantity of times is located, and the quantity of active lists scanned in each round is different.

In a possible implementation, that in each of the Q rounds of scanning, based on the sequence of the m active lists, the electronic device scans from the active list in which the physical page accessed the smallest quantity of times is located, and the quantity of active lists scanned in each round is different is specifically as follows: In each of the Q rounds of scanning, based on the sequence of the m active lists, the electronic device scans from the active list in which the physical page accessed the smallest quantity of times is located, and the quantity of active lists scanned in each round increases by a preset quantity compared with the quantity of active lists scanned in the previous round.

In a possible implementation, the method further includes: In the process of reclaiming the physical pages of the memory by the electronic device, the electronic device scans from the other side of the inactive list, and performs reclaim check on scanned physical pages; and if it is checked that a physical page in the inactive list has not been accessed in a recent preset period, the electronic device reclaims the physical page; or if it is checked that a physical page in the inactive list has been accessed in the recent preset period, the electronic device moves the physical page to the active list with the physical page accessed the smallest quantity of times among the m active lists.

According to a third aspect, an electronic device is provided, including: a processor, a memory, and a touchscreen, where the memory and the touchscreen are coupled to the processor, the memory includes one or more memory zones, each of the one or more memory zones is corresponding to n inactive lists and m active lists, where n is an integer greater than 1, and m is an integer greater than or equal to 1. The memory is configured to store computer program code, the computer program code includes computer instructions, and when the processor reads the computer instructions from the memory, the electronic device is enabled to perform the following operations: putting each of inactive physical pages allocated by the electronic device into a corresponding inactive list among the n inactive lists based on the quantity of mappings to the inactive physical page by application processes; in the process of reclaiming physical pages by the electronic device, scanning each of the n inactive lists, and performing reclaim check on physical pages in each scanned inactive list, where a larger quantity of mappings to the physical page in the inactive list by the application processes indicates a longer scanning cycle corresponding to the inactive list; and if it is checked that physical pages in the n inactive lists have not been accessed in a recent preset period, reclaiming the physical pages; or if it is checked that physical pages in the n inactive lists have been accessed in the recent preset period, moving the physical pages to the m active lists.

In a possible implementation, the scanning each of the n inactive lists includes: sequencing the n inactive lists based on the quantity of mappings to each physical page by the application processes; and in the process of reclaiming the physical pages by the electronic device, performing P rounds of scanning on the n inactive lists, where P is an integer greater than or equal to 2, where in each of the P rounds of scanning, based on the sequence of the n inactive lists, scanning is performed from the inactive list in which the physical page with the smallest quantity of mappings by the application processes is located, and the quantity of inactive lists scanned in each round is different.

In a possible implementation, that in each of the P rounds of scanning, based on the sequence of the n inactive lists, scanning is performed from the inactive list in which the physical page with the smallest quantity of mappings by the application processes is located, and the quantity of inactive lists scanned in each round is different is specifically as follows: In each of the P rounds of scanning, based on the sequence of the n inactive lists, scanning is performed from the inactive list in which the physical page with the smallest quantity of mappings by the application processes is located, and the quantity of inactive lists scanned in each round increases by a preset quantity compared with the quantity of inactive lists scanned in the previous round.

In a possible implementation, the electronic device further performs the following operations: When m is equal to 1, in the process of reclaiming the physical pages by the electronic device, scanning from one side of the active list, and performing reclaim check on scanned physical pages; and if it is checked that a physical page in the active list has not been accessed in the recent preset period, putting the physical page into the inactive list corresponding to the quantity of mappings to the physical page by the application processes; or if it is checked that a physical page in the inactive list has been accessed in the recent preset period, moving the physical page to the other side of the active list.

In a possible implementation, the electronic device further performs the following operations: When m is greater than 1, putting each of active physical pages allocated by the electronic device into a corresponding active list among the m active lists based on the quantity of times the physical page is accessed.

In a possible implementation, if it is checked that physical pages in the n inactive lists have been accessed in the recent preset period, the moving the physical pages to the m active lists specifically includes: if it is checked that physical pages in the n inactive lists have been accessed in the recent preset period, moving the physical pages to the active list with the physical page accessed the smallest quantity of times among the m active lists.

In a possible implementation, the electronic device further performs the following operations: in the process of reclaiming the physical pages by the electronic device, scanning the m active lists, and performing reclaim check on physical pages in the m scanned active lists; if it is checked that physical pages in the m active lists have not been accessed in the recent preset period, putting each of the physical pages into the inactive list corresponding to the quantity of mappings to the physical page by the application processes; and if it is checked that a physical page in the first active list among the m active lists has been accessed in the recent preset period, moving the physical page to the second active list among the m active lists, where the quantity of times the physical page in the second active list is accessed is greater than the quantity of times the physical page in the first active list is accessed.

In a possible implementation, the scanning the m active lists includes: in the process of the reclaiming physical pages by the electronic device, performing Q rounds of scanning on the m active lists, where Q is an integer greater than or equal to 2, where in each of the Q rounds of scanning, based on the sequence of the m active lists, scanning is performed from the active list in which the physical page accessed the smallest quantity of times is located, and the quantity of active lists scanned in each round is different.

In a possible implementation, that in each of the Q rounds of scanning, based on the sequence of the m active lists, scanning is performed from the active list in which the physical page accessed the smallest quantity of times is located, and the quantity of active lists scanned in each round is different is specifically as follows: In each of the Q rounds of scanning, based on the sequence of the m active lists, scanning is performed from the active list in which the physical page accessed the smallest quantity of times is located, and the quantity of active lists scanned in each round increases by a preset quantity compared with the quantity of active lists scanned in the previous round.

According to a fourth aspect, an electronic device is provided, including: a processor, a memory, and a touchscreen, where the memory and the touchscreen are coupled to the processor, the memory includes one or more memory zones, each of the one or more memory zones is corresponding to one inactive list and m active lists, and m is an integer greater than 1. The memory is configured to store computer program code, the computer program code includes computer instructions, and when the processor reads the computer instructions from the memory, the electronic device is enabled to perform the following operations: putting each of active physical pages allocated by the electronic device into a corresponding active list among the m active lists based on the quantity of times the physical page is accessed; in the process of reclaiming physical pages by the electronic device, scanning each of the m active lists, and performing reclaim check on physical pages in each of the m scanned active lists, where a larger quantity of time the physical page in the active list is accessed indicates a longer scanning cycle corresponding to the active list; if it is checked that physical pages in the m active list have not been accessed in the recent preset period, moving the physical pages to one side of the inactive list; and if it is checked that a physical page in the first active list among the m active lists has been accessed in the recent preset period, moving the physical page to the second active list among the m active lists, where the quantity of times the physical page in the second active list is accessed is greater than the quantity of times the physical page in the first active list is accessed.

In a possible implementation, the scanning each of the m active lists includes: in the process of the reclaiming physical pages by the electronic device, performing Q rounds of scanning on the m active lists, where Q is an integer greater than or equal to 2, where in each of the Q rounds of scanning, based on the sequence of the m active lists, scanning is performed from the active list in which the physical page accessed the smallest quantity of times is located, and the quantity of active lists scanned in each round is different.

In a possible implementation, that in each of the Q rounds of scanning, based on the sequence of the m active lists, scanning is performed from the active list in which the physical page accessed the smallest quantity of times is located, and the quantity of active lists scanned in each round is different is specifically as follows: In each of the Q rounds of scanning, based on the sequence of the m active lists, scanning is performed from the active list in which the physical page accessed the smallest quantity of times is located, and the quantity of active lists scanned in each round increases by a preset quantity compared with the quantity of active lists scanned in the previous round.

In a possible implementation, the electronic device further performs the following operations: in the process of reclaiming the physical pages by the electronic device, scanning from the other side of the inactive list, and performing reclaim check on scanned physical pages; and if it is checked that a physical page in the inactive list has not been accessed in a recent preset period, reclaiming the physical page; or if it is checked that a physical page in the inactive list has been accessed in the recent preset period, moving the physical page to the active list with the physical page accessed the smallest quantity of times among the m active lists.

According to a fifth aspect, an apparatus is provided. The apparatus is included in an electronic device and has a function of implementing behavior of the electronic device in any method according to any one of the foregoing aspects and the possible implementations of the aspects. This function may be implemented by hardware, or by hardware executing corresponding software. The hardware or software includes at least one module or unit corresponding to the foregoing function, for example, an allocation module or unit, a scanning module or unit, a reclaiming module or unit, a moving module or unit and a storage module or unit.

According to a sixth aspect, a computer readable storage medium is provided, and includes computer instructions, where when the computer instructions are run on a terminal, the terminal is enabled to perform the method according to any one of the foregoing aspects and the possible implementations of the aspects.

According to a seventh aspect, a computer program product is provided, where when the computer program product runs on a computer, the computer is enabled to performed the method according to any one of the foregoing aspects and the possible implementations of the aspects.

According to an eighth aspect, a chip system is provided, and includes a processor, where when the processor executes instructions, the processor performs the method according to any one of the foregoing aspects and the possible implementations of the aspects.

DESCRIPTION OF EMBODIMENTS

Figure 1:
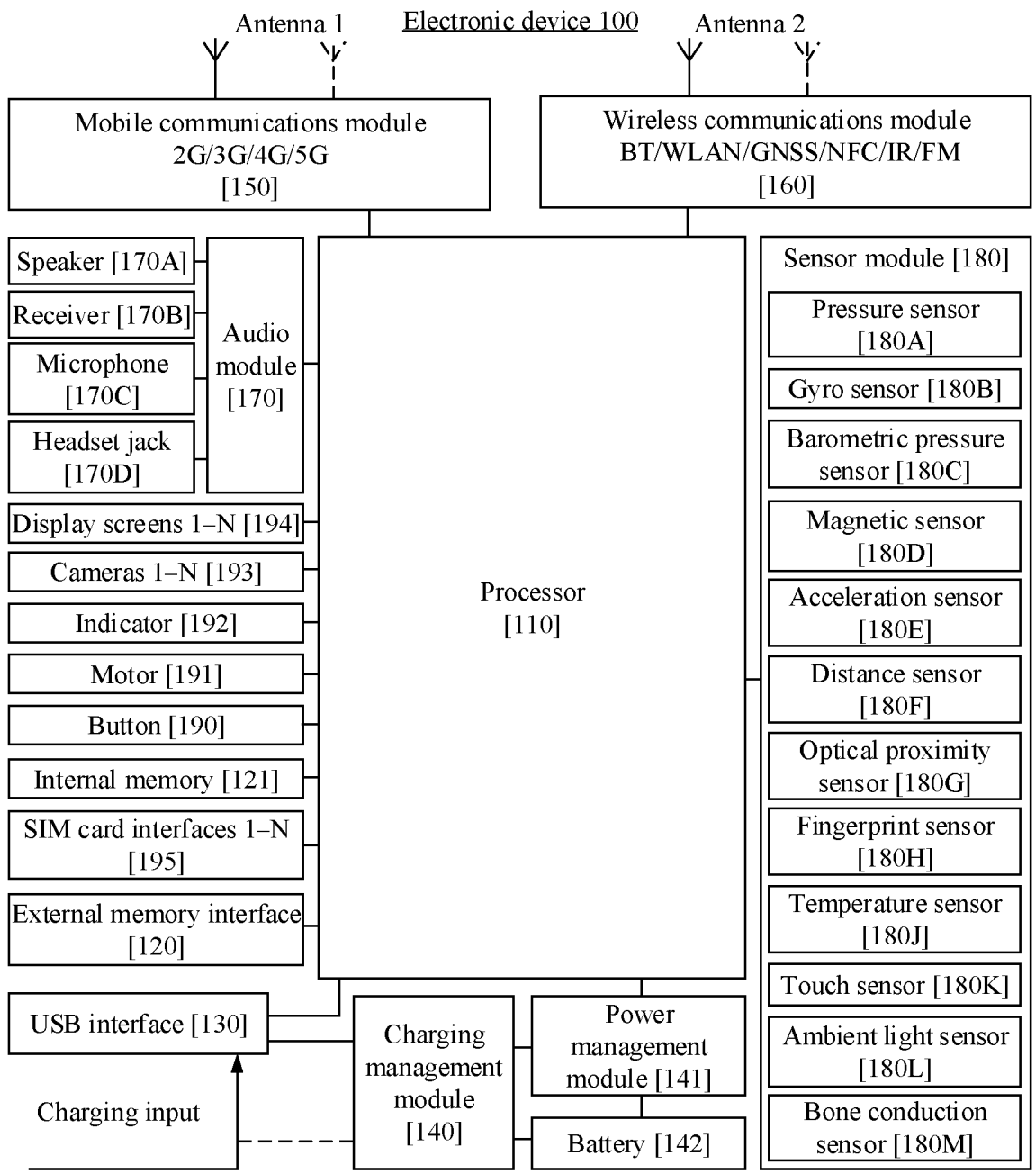
FIG. 1 is a first schematic structural diagram of an electronic device according to an embodiment of this application.

In the description of embodiments of this application, unless otherwise specified, "l" means "or", for example, A/B may mean "A or B"; "and/or" used herein is only used to describe an association relationship between associated objects, and indicates that three relationships may exist. For example, A and/or B may indicate the following: Only A exists, both A and B exist, and only B exists.

The terms "first" and "second" are used herein for description only, and cannot be understood as indicating or implying relative importance or implicitly indicating the quantity of indicated technical features. Therefore, the features defined with "first" and "second" can explicitly or implicitly include one or more of the features. In the description of the embodiments of this application, unless otherwise specified, "a plurality of" means two or more.

In the embodiments of this application, the words such as "example" or "for example" are used to represent giving an example, an illustration, or a description. Any embodiment or design solution described as "example" or "for example" in the embodiments of this application should not be interpreted as being more preferred or advantageous than other embodiments or design solutions. Precisely, words such as "example" or "for example" are used to present related concepts in a specific manner.

An operating system of an electronic device usually divides a memory into a plurality of memory zones (zone), and manages the memory in the unit of memory zone (zone). In the prior art, the operating system uses one inactive_list and one active_list for each memory zone to implement a function of managing physical pages in the memory zone, for example, implement a function of reclaiming physical pages. In the embodiments of this application, the operating system may use a plurality of inactive_lists and one active_list for each memory zone to implement the function of reclaiming physical pages. Alternatively, the operating system may use one inactive_list and a plurality of active_lists for each memory zone to implement the function of reclaiming physical pages. Alternatively, the operating system may use a plurality of inactive_lists and a plurality of active_lists for each memory zone to implement the function of reclaiming physical pages.

Specifically, in some embodiments, the electronic device may put inactive physical pages in different inactive_lists based on how frequently the inactive physical pages are accessed. During reclaiming of physical pages, reclaim check is performed for different inactive_lists based on different cycles. That is, there is a different quantity of times of reclaim check performed on different inactive_lists in the same period. In general, a larger quantity of times physical pages are accessed indicates a longer cycle of performing reclaim check and a smaller quantity of times of reclaim check performed in the same period. Reclaim check refers to checking whether a physical page has been accessed recently (within a recent first preset period), so that corresponding operations can be performed subsequently based on a check result.

On one hand, this reduces reclaim check of a frequently accessed physical page, reduces the probability that the physical page is reclaimed, and prolongs the survival time of the frequently accessed physical page, thereby increasing the cache hit rate of the memory of the operating system. On the other hand, performing reclaim check on the frequently accessed physical page by using a larger cycle is conducive to finding during the reclaim check that the physical page has been accessed within the recent first preset period, so that the physical page is moved from the inactive_list to the active_list, and the survival time of the frequently accessed physical page is prolonged, thereby increasing the cache hit rate of the memory of the operating system.

In a specific implementation, the electronic device may put physical pages in different inactive_lists based on values of mapcount of the physical pages. The mapcount of a physical page is used to indicate the quantity of mappings of the physical page by application processes, that is, the quantity of application process page table entries (page table entries, PTEs) mapped based on the physical page, that is, the quantity of application processes sharing the physical page. It may be considered that when a physical page is shared by more application processes, the probability that the physical page is frequently accessed is higher. Then, in the embodiment of this application, the reclaim check cycle of the shared physical page is prolonged, which is equivalent to prolonging the survival time of the shared physical page. If the shared physical page has been accessed within the prolonged survival time, the electronic device does not reclaim the shared physical page, and if the shared physical page has not been accessed, the electronic device reclaims the shared physical page. It can be learned that, compared with the prior art, the method according to the embodiment of this application is favorable for reducing the chance of reclaiming the shared physical page.

In some other embodiments, the electronic device may further put active physical pages in different active_lists based on how frequently the active physical pages are accessed. Similarly, during reclaiming of physical pages, reclaim check is performed for different active_lists based on different cycles. That is, there is a different quantity of times of reclaim check performed on different active_lists in the same period. In general, a larger quantity of times physical pages are accessed indicates a longer cycle of performing reclaim check and a smaller quantity of times of reclaim check performed in the same period. Reclaim check refers to checking whether a physical page has been accessed within a recent first preset period, so that corresponding operations can be performed subsequently based on a check result. This is because, based on the principle of locality, it can be learned that when a CPU accesses the memory, accessed memory units tend to gather in a relatively small continuous zone, no matter whether the CPU accesses instructions or accesses data. That is, a frequently accessed physical page is usually accessed again, so that it is meaningless and wasteful to repeatedly perform reclaim check on the frequently accessed physical page. However, in this application, reclaim check is performed on the frequently accessed physical page by using a longer cycle, which can avoid unnecessary reclaim check on processes of the operating system and improve the reading and writing performance of the operating system.

In a specific implementation, during the reclaim check, the electronic device can determine whether each physical page has been accessed within the recent first preset period based on a PG_referenced flag of the physical page, and determine how frequently the physical page is accessed with reference to an identifier (used to identify different active_lists) of the active_list in which the physical page is located.

For example, the electronic device according to this application may be a mobile phone, a tablet computer, a personal computer (personal computer, PC), a personal digital assistant (personal digital assistant, PDA), a smartwatch, a netbook, a wearable electronic device, an augmented reality (augmented reality, AR) device, a virtual reality (virtual reality, VR) device, an in-vehicle device, an intelligent vehicle, an intelligent speaker and a robot. No special limitation is imposed on a specific form of the electronic device in this application.

FIG. 1 is a schematic structural diagram of an electronic device 100.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display screen 194, a subscriber identity module (subscriber identity module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in the embodiments of the present invention does not constitute a specific limitation on the electronic device 100. In some other embodiments of this application, the electronic device 100 may include more or fewer components than those shown in the figure, combine some components, split some components, or have different component arrangements. The components shown may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated into one or more processors.

The controller may generate an operation control signal based on an instruction operation code and a time sequence signal, so as to control instruction retrieval and instruction execution.

A memory may be further disposed in the processor 110 to store an instruction and data. In some embodiments, the memory in the processor 110 is a cache memory. The memory can store an instruction or data that the processor 110 has just used or used cyclically. If the processor 110 needs to use the instruction or data again, the instruction or data can be directly invoked from the memory. Repeated access is avoided, and a waiting time of the processor 110 is reduced, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI) interface, a general-purpose input/output (general-purpose input/output, GPIO) interface, a subscriber identity module (subscriber identity module, SIM) interface, a universal serial bus (universal serial bus, USB) interface, and/or the like.

The I2C interface is a bidirectional synchronous serial bus, and includes a serial data line (serial data line, SDA) and a serial clock line (serial clock line, SCL). In some embodiments, the processor 110 may include a plurality of groups of I2C buses. The processor 110 may be coupled to the touch sensor 180K, a charger, a flash, the camera 193 and the like by using different I2C bus interfaces. For example, the processor 110 may be coupled to the touch sensor 180K by using an I2C interface, so that the processor 110 communicates with the touch sensor 180K by using the I2C bus interface, thereby implementing a touch function of the electronic device 100.

The I2S interface can be used for audio communication. In some embodiments, the processor 110 may include a plurality of groups of I2S buses. The processor 110 may be coupled to the audio module 170 by using the I2S bus to implement communication between the processor 110 and the audio module 170. In some embodiments, the audio module 170 can transmit an audio signal to the wireless communications module 160 by using the I2S interface, so as to implement a function of answering calls by using a Bluetooth headset.

The PCM interface can also be used for audio communication to sample, quantize and encode analog signals. In some embodiments, the audio module 170 may be coupled to the wireless communications module 160 by using a PCM bus interface. In some embodiments, the audio module 170 can also transmit an audio signal to the wireless communications module 160 by using the PCM interface, so as to implement a function of answering calls by using a Bluetooth headset. Both the I2S interface and the PCM interface can be used for audio communication.

The UART interface is a universal serial data bus used for asynchronous communication. The bus may be a two-way communication bus. The bus converts to-be-transmitted data between serial communication and parallel communication. In some embodiments, the UART interface is usually used to connect the processor 110 to the wireless communications module 160. For example, the processor 110 communicates with a Bluetooth module in the wireless communications module 160 by using the UART interface to implement a Bluetooth function. In some embodiments, the audio module 170 can transmit an audio signal to the wireless communications module 160 by using the UART interface, so as to implement a function of playing music by using a Bluetooth headset.

The MIPI interface may be configured to connect the processor 110 to peripheral devices such as the display screen 194 and the camera 193. The MIPI interface includes a camera serial interface (camera serial interface, CSI), a display serial interface (display serial interface, DSI), and the like. In some embodiments, the processor 110 and the camera 193 communicate by using the CSI to implement a photographing function of the electronic device 100. The processor 110 and the display screen 194 communicate by using the DSI to implement a display function of the electronic device 100.

The GPIO interface may be configured by using software. The GPIO interface may be configured as a control signal interface or a data signal interface. In some embodiments, the GPIO interface may be configured to connect the processor 110 to the camera 193, the display screen 194, the wireless communications module 160, the audio module 170, the sensor module 180, and the like. The GPIO interface may alternatively be configured as an I2C interface, an I2S interface, a UART interface, an MIPI interface, or the like.

The USB interface 130 is an interface that complies with a USB standard specification, and specifically may be a Mini USB interface, a Micro USB interface, a USB Type C interface, or the like. The USB interface 130 may be configured to connect to the charger to charge the electronic device 100, or may be configured to transmit data between the electronic device 100 and peripheral devices. The USB interface 130 may be further configured to connect to a headset, so as to play audio by using the headset. The interface may be further configured to connect to another electronic device, such as an AR device.

It can be understood that the interface connection relationship between the modules illustrated in the embodiments of the present invention is merely an example for description, and does not constitute a limitation on the structure of the electronic device 100. In some other embodiments of this application, the electronic device 100 may alternatively use an interface connection mode that is different from those in the foregoing embodiments, or use a combination of a plurality of interface connection modes.

The charging management module 140 is configured to receive a charging input from the charger. The charger may be a wireless charger, or may be a wired charger. In some embodiments of wired charging, the charging management module 140 can receive a charging input of the wired charger by using the USB interface 130. In some embodiments of wireless charging, the charging management module 140 can receive a wireless charging input by using a wireless charging coil of the electronic device 100. When charging the battery 142, the charging management module 140 can further supply power to the electronic device by using the power management module 141.

The power management module 141 is configured to connect the battery 142, the charging management module 140, and the processor 110. The power management module 141 receives an input from the battery 142 and/or the charging management module 140, and supplies power to the processor 110, the internal memory 121, the display screen 194, the camera 193, the wireless communications module 160, and the like. The power management module 141 may be further configured to monitor parameters such as a battery capacity, battery recycling times, and a battery health status (leakage and impedance). In some other embodiments, the power management module 141 may alternatively be disposed in the processor 110. In some other embodiments, the power management module 141 and the charging management module 140 may alternatively be disposed in the same device.

The wireless communication function of the electronic device 100 can be implemented by the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be multiplexed to improve antenna utilization. For example, the antenna 1 may be multiplexed into a diversity antenna of a wireless local area network. In some other embodiments, the antenna may be used in combination with a tuning switch.

The mobile communications module 150 can provide a wireless communication solution including 2G/3G/4G/5G and the like applied to the electronic device 100. The mobile communications module 150 may include at least one filter, a switch, a power amplifier, a low noise amplifier (low noise amplifier, LNA), and the like. The mobile communications module 150 can receive an electromagnetic wave by using the antenna 1, perform processing such as filtering and amplifying on the received electromagnetic wave, and transmit the processed electromagnetic wave to the modem processor for demodulation. The mobile communications module 150 can further amplify a signal that is modulated by the modem processor, and the signal is converted into an electromagnetic wave and radiated by the antenna 1. In some embodiments, at least some functional modules of the mobile communications module 150 may be disposed in the processor 110. In some embodiments, at least some functional modules of the mobile communications module 150 and at least some modules of the processor 110 may be disposed in the same device.

The modem processor may include a modulator and a demodulator. The modulator is configured to modulate a to-be-sent low frequency baseband signal into a medium-high frequency signal. The demodulator is configured to demodulate a received electromagnetic wave signal into a low frequency baseband signal. Then the demodulator transmits the demodulated low frequency baseband signal to a baseband processor for processing. After the low frequency baseband signal is processed by the baseband processor, the processed low frequency baseband signal is transmitted to an application processor. The application processor outputs a sound signal by using an audio device (not limited to the speaker 170A, the receiver 170B, and the like), or displays an image or video by using the display screen 194. In some embodiments, the modem processor may be an independent device. In some other embodiments, the modem processor may be independent of the processor 110 and be disposed in the same device as the mobile communications module 150 or other functional modules.

The wireless communications module 160 may provide a wireless communication solution that is applied to the electronic device 100, including wireless local area network (wireless local area network, WLAN) (such as a wireless fidelity (wireless fidelity, Wi-Fi) network), Bluetooth (Bluetooth, BT), global navigation satellite system (global navigation satellite system, GNSS), frequency modulation (frequency modulation, FM), near field communication (near field communication, NFC), infrared (infrared, IR), and the like. The wireless communications module 160 may be one or more devices integrating at least one communication processing module. The wireless communications module 160 receives an electromagnetic wave by using the antenna 2, performs processing of frequency modulation and filtering on the electromagnetic wave signal, and sends the processed signal to the processor 110. The wireless communications module 160 can further receive a to-be-sent signal from the processor 110, and perform frequency modulation and amplification on the signal. The signal is converted into an electromagnetic wave and radiated by the antenna 2.

In some embodiments, the antenna 1 of the electronic device 100 is coupled to the mobile communications module 150, and the antenna 2 is coupled to the wireless communications module 160, so that the electronic device 100 may communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, an IR technology, and/or the like. The GNSS may include a global positioning system (global positioning system, GPS), a global navigation satellite system (global navigation satellite system, GLONASS), a Beidou navigation satellite system (Beidou navigation satellite system, BDS), a quasi-zenith satellite system (quasi-zenith satellite system, QZSS), and/or a satellite based augmentation system (satellite based augmentation system, SBAS).

The electronic device 100 implements a display function by using the GPU, the display screen 194, the application processor, and the like. The GPU is an image processing microprocessor, which is connected to the display screen 194 and the application processor. The GPU is configured to perform mathematical and geometric calculations to render graphics. The processor 110 may include one or more GPUs that execute program instructions to generate or change display information.

The display screen 194 is configured to display an image, a video, and the like. The display screen 194 includes a display panel. The display panel may be a liquid crystal display (liquid crystal display, LCD), an organic light-emitting diode (organic light-emitting diode, OLED), an active matrix organic light-emitting diode (active-matrix organic light-emitting diode, AMOLED), a flex light-emitting diode (flex light-emitting diode, FLED), a Miniled, a MicroLed, a Micro-oLed, quantum dot light-emitting diodes (quantum dot light-emitting diodes, QLED), or the like. In some embodiments, the electronic device 100 may include 1 or N display screens 194, and N is a positive integer greater than 1.

The electronic device 100 can implement a photographing function by using the ISP, the camera 193, the video codec, the GPU, the display screen 194, the application processor, and the like.

The ISP is configured to process data fed back by the camera 193. For example, during photographing, a shutter is opened, light is transmitted to a photosensitive element of the camera by using a lens, an optical signal is converted into an electrical signal, and the photosensitive element of the camera transfers the electrical signal to the ISP for processing, so that the electrical signal is converted into an image visible to a naked eye. The ISP can further optimize algorithms for noise, brightness, and a skin color of the image. The ISP can further optimize parameters such as exposure and color temperature of the photographing scene. In some embodiments, the ISP may be disposed in the camera 193.

The camera 193 is configured to capture a still image or a video. An optical image is generated for an object by using the lens and is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP. The ISP converts the electrical signal into a digital image signal. The ISP outputs the digital image signal to the DSP for processing. The DSP converts the digital image signal into an image signal in a standard format of RGB, YUV, or the like. In some embodiments, the electronic device 100 may include 1 or N cameras 193, and N is a positive integer greater than 1.

The digital signal processor is configured to process a digital signal. In addition to processing a digital image signal, the digital signal processor can further process another digital signal. For example, when the electronic device 100 selects a frequency, the digital signal processor is configured to perform Fourier transform or the like on energy of the frequency.

The video codec is configured to compress or decompress a digital video. The electronic device 100 can support one or more video codecs. In this way, the electronic device 100 can play or record videos in a plurality of encoding formats, such as moving picture experts group (moving picture experts group, MPEG)-1, MPEG-2, MPEG-3, and MPEG-4.

The NPU is a neural-network (neural-network, NN) computing processor. By referring to a structure of a biological neural network, such as a transfer mode between human brain neurons, the NPU quickly processes input information, and can further perform continuous self-learning. The NPU can implement applications such as intelligent cognition of the electronic device 100, for example, image recognition, face recognition, voice recognition, and text understanding.

The external memory interface 120 may be configured to connect to an external storage card such as a Micro SD card, to expand a storage capacity of the electronic device 100. The external storage card communicates with the processor 110 by using the external memory interface 120 to implement a data storage function. For example, music, video, and other files are stored in the external storage card.

The internal memory 121 may be configured to store computer executable program code, where the executable program code includes an instruction. The internal memory 121 may include a program storage area and a data storage area. The program storage area may store an operating system, an application program required by at least one function (for example, a sound play function or an image play function), or the like. The data storage area may store data (such as audio data or a phone book) created during use of the electronic device 100. In addition, the internal memory 121 may include a high-speed random access memory, and may further include a non-volatile memory, such as at least one magnetic disk storage device, a flash memory device, or a universal flash storage (universal flash storage, UFS). By running the instruction stored in the internal memory 121, and/or the instruction stored in the memory disposed in the processor, the processor 110 executes various function applications and data processing of the electronic device 100.

The electronic device 100 can implement the audio functions (such as music playing and sound recording) by using the audio module 170, the speaker 170A, the receiver 170B, the microphone 170C, the headset jack 170D, the application processor, or the like.

The audio module 170 is configured to convert digital audio information into an analog audio signal for output, and is further configured to convert an analog audio input into a digital audio signal. The audio module 170 may be further configured to encode and decode audio signals. In some embodiments, the audio module 170 may be arranged in the processor 110, or some of the functional modules of the audio module 170 may be arranged in the processor 110.

The speaker 170A, also referred to as a "loudspeaker", is configured to convert an audio electrical signal into a sound signal. The electronic device 100 can listen to music by using the speaker 170A, or listen to a hands-free call.

The receiver 170B is configured to convert an audio electrical signal into a sound signal. When the electronic device 100 receives a call or voice message, the receiver 170B can be placed close to an ear to receive the voice.

The microphone 170C is configured to convert a sound signal into an electrical signal. When making a call or sending a voice message, the user can make the mouth approach the microphone 170C and emit a sound, so as to input a sound signal into the microphone 170C. The electronic device 100 may be provided with at least one microphone 170C. In some other embodiments, the electronic device 100 may be provided with two microphones 170C, which can implement noise reduction function in addition to collecting sound signals. In some other embodiments, the electronic device 100 may alternatively be provided with three, four, or more microphones 170C to implement sound signal collection, noise reduction, sound source recognition, directional recording, and the like functions.

The headset jack 170D is configured to connect to a wired headset. The headset jack 170D may be a USB interface 130, or may be a 3.5 mm open electronic device platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal and can convert the pressure signal into an electrical signal. In some embodiments, the pressure sensor 180A may be disposed on the display screen 194. There are many types of pressure sensors 180A, such as a resistive pressure sensor, an inductive pressure sensor, and a capacitive pressure sensor. The capacitive pressure sensor may include at least two parallel plates with conductive material. When a force is applied to the pressure sensor 180A, capacitance between electrodes changes. The electronic device 100 determines intensity of the pressure based on the change in capacitance. When a touch operation is applied to the display screen 194, the electronic device 100 detects intensity of the touch operation based on the pressure sensor 180A. The electronic device 100 can further calculate a touch position based on the detection signal of the pressure sensor 180A. In some embodiments, touch operations that are applied to the same touch position but have different touch operation intensity may be corresponding to different operation instructions. For example, when a touch operation whose touch operation intensity is less than a first pressure threshold is applied to a short message application icon, an instruction for viewing a short message is executed. When a touch operation whose touch operation intensity is greater than or equal to the first pressure threshold is applied to the short message application icon, an instruction for creating a short message is executed.

The gyro sensor 180B may be configured to determine a movement posture of the electronic device 100. In some embodiments, the gyro sensor 180B may be configured to determine angular velocities of the electronic device 100 around three axes (that is, x, y, and z axes). The gyro sensor 180B can be used for image stabilization. For example, when the shutter is pressed, the gyro sensor 180B detects a shake angle of the electronic device 100, calculates a distance that a lens module needs to compensate based on the angle, and allows the lens to counteract the shake of the electronic device 100 through reverse movement to implement image stabilization. The gyro sensor 180B can further be used for navigation and somatosensory game scenes.

The barometric pressure sensor 180C is configured to measure barometric pressure. In some embodiments, the electronic device 100 calculates the altitude by using a barometric pressure value measured by the barometric pressure sensor 180C, to assist in positioning and navigation.

The magnetic sensor 180D includes a Hall sensor. The electronic device 100 can use the magnetic sensor 180D to detect the opening and closing of a flip holster. In some embodiments, when the electronic device 100 is a flip phone, the electronic device 100 can detect the opening and closing of a flip based on the magnetic sensor 180D, so as to set features such as automatic unlocking of the flip based on the detected opening and closing state of the holster or the opening and closing state of the flip.

The acceleration sensor 180E can detect magnitudes of acceleration of the electronic device 100 in various directions (generally three axes). When the electronic device 100 is still, a value and a direction of gravity may be detected. The acceleration sensor 180E may be further configured to identify the posture of the electronic device, and be used in applications such as switching between a landscape screen and a portrait screen, and a pedometer.

The distance sensor 180F is configured to measure a distance. The electronic device 100 can measure the distance by using infrared or laser. In some embodiments, in a photographing scenario, the electronic device 100 can use the distance sensor 180F to measure a distance to implement quick focusing.

The optical proximity sensor 180G may include, for example, a light-emitting diode (LED) and an optical detector such as a photodiode. The light-emitting diode may be an infrared light-emitting diode. The electronic device 100 emits infrared light outward by using the light-emitting diode. The electronic device 100 uses the photodiode to detect infrared reflected light from a nearby object. When sufficient reflected light is detected, it can be determined that there is an object near the electronic device 100. When insufficient reflected light is detected, the electronic device 100 may determine that there is no object near the electronic device 100. The electronic device 100 can use the optical proximity sensor 180G to detect that the user holds the electronic device 100 close to the ear, so as to automatically turn off the screen to save power. The optical proximity sensor 180G may alternatively be used in a holster mode or a pocket mode to automatically unlock or lock the screen.

The ambient light sensor 180L is configured to sense brightness of ambient light. The electronic device 100 can adaptively adjust brightness of the display screen 194 based on the sensed brightness of the ambient light. The ambient light sensor 180L may be further configured to automatically adjust white balance during photographing. The ambient light sensor 180L can further cooperate with the optical proximity sensor 180G to detect whether the electronic device 100 is in a pocket, so as to prevent accidental touch.

The fingerprint sensor 180H is configured to collect a fingerprint. The electronic device 100 can use the collected fingerprint characteristics to implement fingerprint-based unlocking, application lock accessing, fingerprint-based photographing, fingerprint-based incoming call receiving, and the like.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 degrades performance of a processor located near the temperature sensor 180J, so as to reduce power consumption and implement thermal protection. In some other embodiments, when the temperature is lower than another threshold, the electronic device 100 heats the battery 142 to avoid abnormal shutdown of the electronic device 100 caused by low temperature. In some other embodiments, when the temperature is lower than still another threshold, the electronic device 100 boosts an output voltage of the battery 142 to avoid abnormal shutdown caused by low temperature.

The touch sensor 180K is also referred to as a "touch device". The touch sensor 180K may be disposed on the display screen 194, and the touch sensor 180K and the display screen 194 form a touchscreen, which is also referred to as a "touch-controlled screen". The touch sensor 180K is configured to detect a touch operation performed on or near the touch sensor 180K. The touch sensor can transfer a detected touch operation to the application processor to determine a type of a touch event. The display screen 194 may be configured to provide a visual output related to the touch operation. In some other embodiments, the touch sensor 180K may alternatively be disposed on a surface of the electronic device 100, which is different from the position of the display screen 194.

The bone conduction sensor 180M can obtain a vibration signal. In some embodiments, the bone conduction sensor 180M can obtain a vibration signal obtained from bone mass vibration by a human voice part. The bone conduction sensor 180M can be further in contact with the human pulse to receive a blood pressure and pulse signal. In some embodiments, the bone conduction sensor 180M may alternatively be disposed a headset to be combined into a bone conduction headset. The audio module 170 can obtain a speech signal through parsing based on the vibration signal that is obtained by the bone conduction sensor 180M from bone mass vibration by the voice part, to implement a speech function. The application processor can parse heart rate information based on the blood pressure and pulse signal obtained by the bone conduction sensor 180M, to implement a heart rate detection function.

The button 190 includes a power-on button, a volume button, or the like. The button 190 may be a mechanical button, or a touch button. The electronic device 100 can receive a key input, and generate a key signal input related to user setting and function control of the electronic device 100.

The motor 191 can generate a vibration alert. The motor 191 can be used for a vibration alert on an incoming call, or can be used for touch vibration feedback. For example, touch operations that act on different applications (such as photographing and audio playback) may be corresponding to different vibration feedback effects. In response to touch operations that act on different areas of the display screen 194, the motor 191 may also be corresponding to different vibration feedback effects. Different application scenarios (such as time reminding, receiving information, alarm clock and games) may also be corresponding to different vibration feedback effects. Touch vibration feedback effects can also support customization.

The indicator 192 may be an indicator light, which may be configured to indicate a charging state and a power change, or to indicate a message, a missed call, a notification, or the like.

The SIM card interface 195 is configured to connect to an SIM card. An SIM card can be inserted into the SIM card interface 195 or pulled out from the SIM card interface 195 to implement contact with or separation from the electronic device 100. The electronic device 100 can support 1 or N SIM card interfaces, where N is a positive integer greater than 1. The SIM card interface 195 can support a Nano SIM card, a Micro SIM card, an SIM card, and the like. The same SIM card interface 195 allows a plurality of cards to be inserted simultaneously. Types of the plurality of cards may be the same or different. The SIM card interface 195 can also be compatible with different types of SIM cards. The SIM card interface 195 can also be compatible with an external storage card. The electronic device 100 interacts with the network by using the SIM card to implement functions such as call and data communication. In some embodiments, the electronic device 100 uses an eSIM, that is, an embedded SIM card. The eSIM card can be embedded in the electronic device 100 and cannot be separated from the electronic device 100.

A software system of the electronic device 100 may use a layered architecture, an event-driven architecture, a micro-core architecture, a micro-service architecture, or a cloud architecture. The embodiment of the present invention uses an Android system with a layered architecture as an example to exemplify the software architecture of the electronic device 100.

Figure 2:
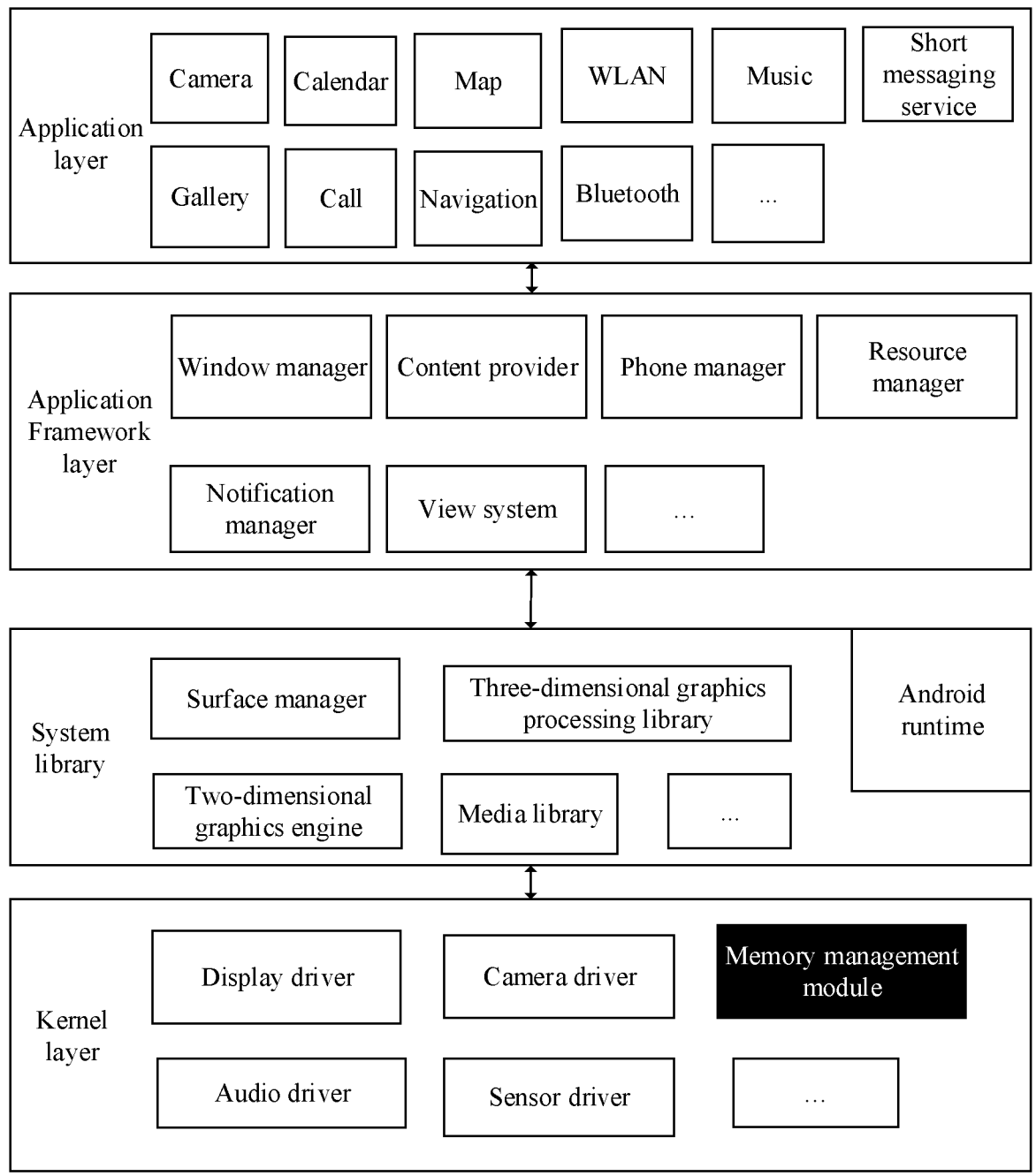
FIG. 2 is a second schematic structural diagram of an electronic device according to an embodiment of this application.

FIG. 2 is a structural block diagram of software of an electronic device 100 according to an embodiment of the present invention.

A layered architecture divides the software into several layers, and each layer has a clear role and division of labor. The layers communicate with each other by using a software interface. In some embodiments, the Android system is divided into four layers, which are respectively an application layer, an application framework layer, an Android runtime (Android runtime) and a system library, and a kernel layer from top to bottom.

The application layer may include a series of application packages.

As shown in FIG. 2, the application package may include applications such as camera, gallery, calendar, call, map, navigation, WLAN, Bluetooth, music, video, and short messaging service.

The application framework layer provides an application programming interface (application programming interface, API) and a programming framework for applications at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager can obtain the size of the display screen, determine whether there is a status bar, lock the screen, take a screenshot, and the like.

The content provider is configured to store and obtain data, and make these data accessible to applications. The data may include videos, images, audio, calls made and received, browsing history and bookmarks, a telephone directory, and the like.

The view system includes visual controls, such as a control for displaying text, a control for displaying pictures, and the like. The view system may be configured to build an application. The display interface may be composed of one or more views. For example, a display interface that includes an short messaging service notification icon may include a view that displays text and a view that displays a picture.

The phone manager is configured to provide a communication function of the electronic device 100, such as management of a call state (including connecting, hanging up, and the like).

The resource manager provides various resources for an application, such as a localized string, an icon, a picture, a layout file and a video file.

The notification manager enables an application to display notification information in the status bar, which can be used to convey a notification-type message, and can automatically disappear after a short stay without user interaction. For example, the notification manager is used for notification on download completion and message reminding. The notification manager can also provide a notification that appears in the status bar at the top of the system in the form of a chart or a scroll bar text, such as a notification of an application running in the background, or a notification that appears on the screen in the form of a dialog window. For example, a text information prompt is provided in the status bar, a prompt tone is issued, the electronic device vibrates, and an indicator light flashes.

The Android runtime includes a core library and a virtual machine. The Android runtime is responsible for scheduling and management of the Android system.

The core library includes two parts: one part is function functions that the java language needs to invoke, and the other part is the core library of Android.

The application layer and the application framework layer run in a virtual machine. The virtual machine executes java files of the application layer and the application framework layer as binary files. The virtual machine is configured to perform functions such as object life cycle management, stack management, thread management, security and exception management, and garbage collection.

The system library may include a plurality of functional modules, such as a surface manager (surface manager), media libraries (Media Libraries), a three-dimensional graphics processing library (for example, OpenGL ES) and a 2D graphics engine (for example, SGL).

The surface manager is configured to manage a display subsystem and provides a fusion of 2D and 3D layers for a plurality of applications.

The media library supports playback and recording of a variety of commonly used audio and video formats, as well as still image files, and the like. The media library can support a plurality of audio and video encoding formats, such as: MPEG4, H.264, MP3, AAC, AMR, JPG, and PNG.

The three-dimensional graphics processing library is configured to implement three-dimensional graphics drawing, image rendering, synthesis, layer processing, and the like.

The 2D graphics engine is a drawing engine for 2D drawing.

The kernel layer is a layer between hardware and software. The kernel layer includes at least a display driver, a camera driver, an audio driver, and a sensor driver.

In this embodiment of this application, the kernel layer further includes a memory management (memory management) module, configured to allocate and manage memory resources of the electronic device 100, specifically including efficient and quick allocation of memory resources, and release and reclaiming of the memory resources when appropriate.

For example, the memory management module uses a plurality of inactive_lists and/or a plurality of active_lists to manage allocated physical pages. Newly allocated physical pages are put in the corresponding inactive_lists and/or active_lists.

For another example, when performing an operation of reclaiming physical pages, the memory management module may use a specific scanning solution to scan physical pages in a plurality of inactive_lists and/or a plurality of active_lists, and perform a reclaim check on the scanned physical pages.

For still another example, when reclaim check is performed on a physical page in the inactive_list, the physical page is reclaimed based on a result of reclaim check, or the physical page is moved to a specific active_list. When reclaim check is performed on the active_list, the physical page is moved to another active_list or a specific inactive_list based on the result of reclaim check. A specific solution is described in detail below.

The technical solutions involved in the embodiments of this application can all be implemented in the electronic device 100 having the foregoing hardware architecture and software architecture. Hereinafter, the Linux operating system is installed in the electronic device 100 as an example for description.

Figure 3:
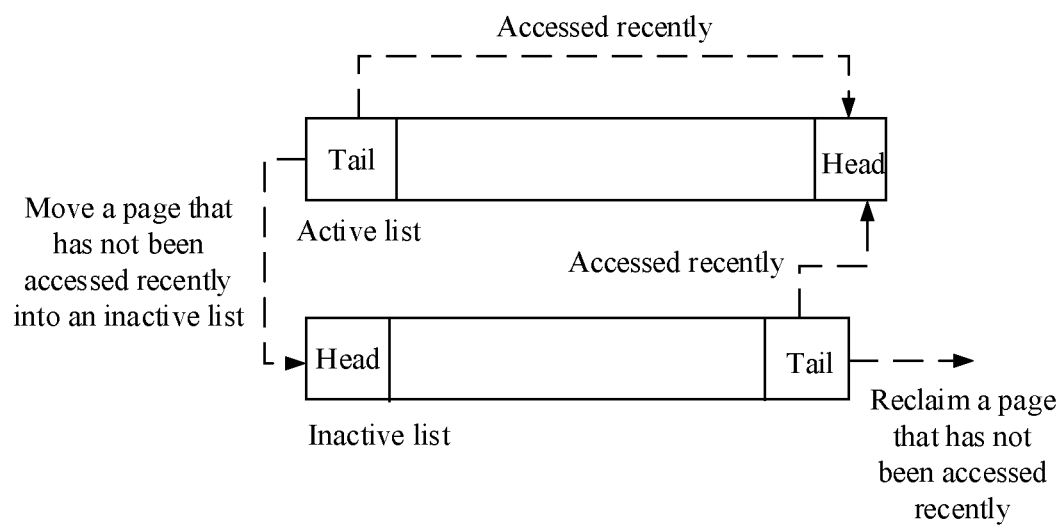
FIG. 3 is a schematic diagram of a process of reclaiming physical pages in the prior art.

In the prior art, as shown in FIG. 3, the operating system uses only one inactive_list and one active_list for each memory zone to maintain each physical page allocated by the operating system. When performing a reclaim operation on physical pages, the operating system scans each physical page from the tail of the inactive_list, and checks whether the scanned physical page has been accessed within the recent first preset period. If the scanned physical page has been accessed, the physical page is inserted in the head of the active_list. If the scanned physical page has not been accessed, the physical page may be reclaimed. It should be noted that a limitation is imposed on the ratio and total of the quantity of physical pages in the inactive_lists and the quantity of physical pages in the active_lists. If the ratio of the quantity of physical pages in the inactive_lists to the quantity of physical pages in the active_lists is lower than a threshold, physical pages in the active_list will be scanned, and physical pages unused in the recent first preset period will be moved to the head of the inactive_list, until the physical pages reclaimed from the inactive_list meets a memory requirement.

However, in this embodiment of this application, the operating system uses a plurality of inactive_lists and one or more active_lists for each memory zone to maintain each physical page allocated by the operating system. In addition, different reclaim check cycles are adopted for different inactive_lists, so as to prolong the reclaim check cycle for frequently accessed physical pages (such as physical pages shared by a plurality of application processes), prolong the survival time of the frequently accessed physical pages, increase the cache hit rate of the memory and improve the reading and writing performance of the operating system. Alternatively, the operating system uses a plurality of active_lists and one or more inactive_lists for one memory zone to maintain each physical page allocated by the operating system. In addition, different reclaim check cycles are adopted for different active_lists, so as to prolong the cycles of reclaim check on frequently accessed physical pages, reduce unnecessary reclaim check and improve the reading and writing performance of the operating system.

Figure 4:
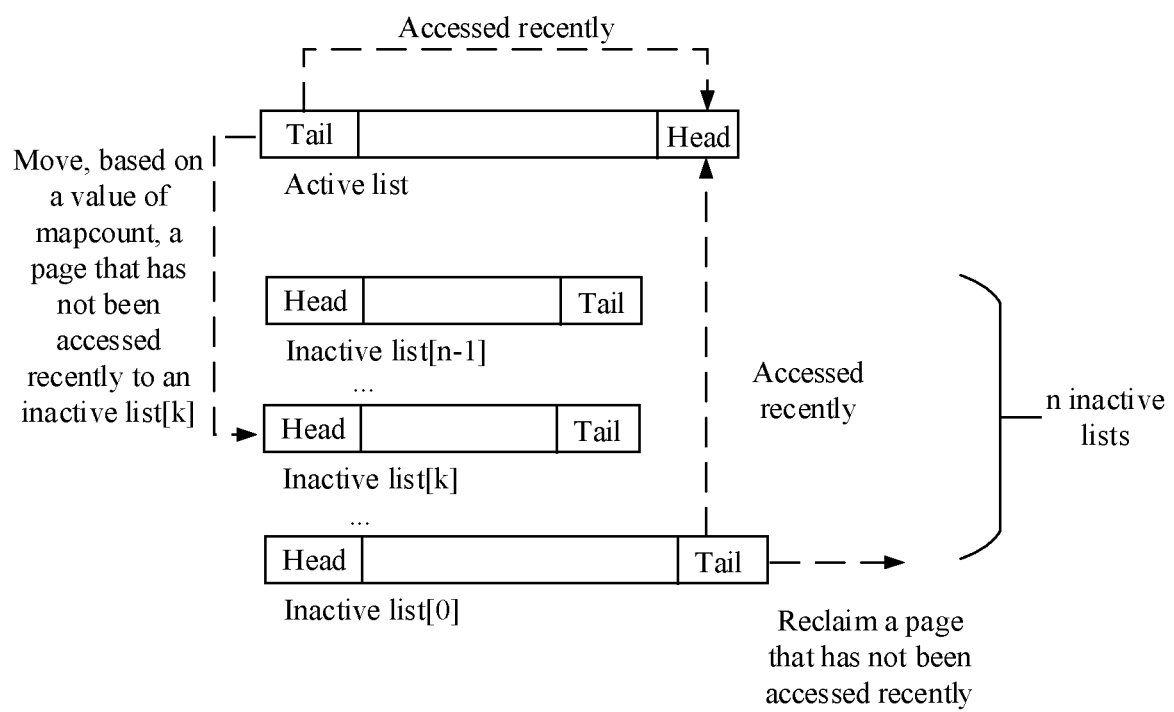
FIG. 4 is a schematic process diagram of a memory management method according to an embodiment of this application.

In some embodiments, as shown in FIG. 4, the operating system may use n inactive_lists and one active_list for each memory zone, and use different reclaim check cycles for different inactive_lists. n is an integer greater than or equal to 2.

1. The division basis of different inactive_lists are described first, and different reclaim check cycles are adopted for different inactive_lists.

To facilitate distinguishing between different inactive_lists, an inactive_list[i] is used to represent an $i^{th}$ inactive_list herein, that is, an i value represents an index value or an identifier of the inactive_list. In this application, n inactive_lists are obtained through division based on the time of times the physical pages are accessed. That is, the quantity of times the physical pages stored in the inactive_list[i] are accessed is positively correlated or inversely correlated with the size of the i value in the inactive_list[i].

It should be noted that the n inactive_lists are obtained through division herein to facilitate subsequent separate use of different scanning cycles and reclaim cycles for the n inactive_lists. Therefore, they may be n inactive_lists obtained through logical division, that is, the n inactive_lists are not necessarily physically separated.

For example, as described above, a larger value of mapcount of a physical page indicates that the physical page is shared by more applications, so that it may be considered that there is a greater probability that the physical page is frequently accessed, that is, there is a larger quantity of times the physical page is accessed. Therefore, n inactive_list may be obtained through division based on the size sequence of mapcount of the physical page stored in the inactive_list[i], so that the value of mapcount of the physical page stored in the inactive_list[i] is positively correlated or inversely correlated with the size of the i value. For example, a larger value of mapcount of the physical page stored in the inactive_list[i] indicates a larger i value or a smaller i value.

With n=4, the value of mapcount of the physical page stored in the inactive_list[i] is positively correlated with the size of the i value as an example.

For example, Table 1 shows a correspondence between a value of mapcount of a physical page and an inactive_list[i].

TABLE 1

| Value of mapcount | Corresponding inactive_list[i] |
|---|---|
| mapcount = 1 | inactive_list[0] |
| mapcount = 2 | inactive_list[1] |
| mapcount = 3 | inactive_list[2] |
| mapcount ≥ 4 | inactive_list[3] |

That is, when the value of mapcount (mapcount) of a physical page is 1, the physical page is put into the inactive_list[0]; when the value of mapcount (mapcount) of a physical page is 2, the physical page is put into the inactive_list[1]; when the value of mapcount (mapcount) of the physical page is 3, the physical page is put into the inactive_list[2]; and when the value of mapcount (mapcount) of a physical page is greater than or equal to 4, the physical page is put into the inactive_list[3].

It can be learned that, the quantity of times the physical page in the inactive_list[0] is accessed <the quantity of times the physical page in the inactive_list[1] is accessed <the quantity of times the physical page in the inactive_list[2] is accessed <the quantity of times the physical page in the inactive_list[3] is accessed.

For another example, Table 2 shows another correspondence between a value of mapcount of a physical page and an inactive_list[i].

TABLE 2

| Value of mapcount | Corresponding inactive_list[i] |
|---|---|
| mapcount = 1, 2 | inactive_list[0] |
| mapcount = 3, 4 | inactive_list[1] |
| mapcount = 5, 6 | inactive_list[2] |
| mapcount ≥ 7 | inactive_list[3] |

It can be learned that, the quantity of times the physical page in the inactive_list[0] is accessed <the quantity of times the physical page in the inactive_list[1] is accessed <the quantity of times the physical page in the inactive_list[2] is accessed <the quantity of times the physical page in the inactive_list[3] is accessed. For other contents, reference may be made to the description in Table 1.

For still another example, Table 3 shows still another correspondence between a value of mapcount of a physical page and an inactive_list[i].

TABLE 3

| Value of mapcount | Corresponding inactive_list[i] |
|---|---|
| mapcount = 1 | inactive_list[0] |
| mapcount = 2, 3 | inactive_list[1] |
| mapcount = 4, 5, 6 | inactive_list[2] |
| mapcount ≥ 7 | inactive_list[3] |

It can be learned that, the quantity of times the physical page in the inactive_list[0] is accessed <the quantity of times the physical page in the inactive_list[1] is accessed <the quantity of times the physical page in the inactive_list[2] is accessed <the quantity of times the physical page in the inactive_list[3] is accessed. For other contents, reference may be made to the description in Table 1.

In conclusion, in the embodiment of this application, no limitation is imposed on a specific correspondence between the value of mapcount of a physical page and the inactive_list[i], provided that the value of the mapcount of the physical page is roughly positively correlated or inversely correlated with the i value in the inactive_list[i].

When performing a reclaim operation on physical pages, the operating system scans physical pages in each inactive_list, and performs reclaim check on the scanned physical pages, that is, the operating system determines whether the physical page has been accessed within the recent first preset period, so as to subsequently perform different operations based on different check results. In this application, the scanning cycle of the inactive_list (hereinafter referred to as the frequently accessed inactive_list) storing frequently accessed physical pages may be prolonged, and then the cycle of reclaim check on the physical pages in the frequently accessed inactive_list may be prolonged, so as to prolong the cycle of reclaim check on frequently accessed physical pages, and reduce the quantity of times of reclaim check on the frequently accessed physical pages. That is, a larger quantity of times the physical pages are accessed indicates a longer corresponding scanning cycle and a longer corresponding cycle of reclaim check.

Using Table 1 as an example, it is learned based on the foregoing analysis that, the quantity of times the physical page in the inactive_list[0] is accessed <the quantity of times the physical page in the inactive_list[1] is accessed <the quantity of times the physical page in the inactive_list[2] is accessed <the quantity of times the physical page in the inactive_list[3] is accessed. Then, the scanning cycle of each inactive_list may be set as follows: scanning cycle of inactive_list[0]>scanning cycle of inactive_list[1]>scanning cycle of inactive_list[2]>scanning cycle of inactive_list[3].

In general, P rounds of scanning may be performed on n inactive_lists, and inactive_lists with a larger quantity of times of access are added based on certain rules during each round of scanning. P is greater than or equal to 2. In this way, in P rounds of scanning, all physical pages in the n inactive_lists have been scanned at least once, and inactive_lists with a smaller quantity of times of access participate in more rounds of scanning than inactive_lists with a larger quantity of times of access. Two specific solutions, solution 1 and solution 2, are given as an example below.

Solution 1: Scanning is performed from the tail of an inactive_list with a smallest quantity of times of access, and a specific number (for example: 1) of inactive_lists with a larger quantity of times of access are added during each round of scanning.

During specific implementation, a count a may be added to indicate inactive lists to be processed in the current round of scanning. For example, inactive_list[0:a] indicates that the current round of scanning should be performed on an inactive_list[0] to an inactive_list[a]. A count e indicates an inactive_list[e] currently being processed. In a scanning process, reference may be made to the following code:

Select_list(a,e,n)
{
if (e<a) {return inactive_list[e++]; }
if (a<n) {return select_list(e++, e=0); }
else {return select_list(a=1, k=0, n); }
}

The four inactive_lists (n=4) shown in FIG. 4 are used as an example, and the inactive_list[0] being a list with a smallest quantity of times of physical page access is used as an example.

The inactive_list[0] is scanned in the first round;
the inactive_list[0] and the inactive_list[1] are scanned in the second round;
the inactive_list[0], the inactive_list[1] and the inactive_list[2] are scanned in the third round; and
the inactive_list[0], the inactive_list[1], the inactive_list [2] and the inactive_list[3] are scanned in the fourth round.

It can be learned from the above that after the four rounds of scanning (P=4), all the physical pages in the inactive_list [0] to the inactive_list[3] have been scanned once. Further, the inactive_list[0] are scanned four times, the inactive_list [1] are scanned three times, the inactive_list[2] are scanned twice, and the inactive_list[3] are scanned once.

Solution 2: Scanning is performed from the tail of an inactive_list with a smallest quantity of times of access, and a specific quantity of inactive_lists with a larger quantity of times of access are added during one round of scanning after a preset quantity of rounds of scanning.

The four inactive_lists shown in FIG. 4 is still used as an example, and the inactive_list[0] being a list with a smallest quantity of times of physical page access is used as an example.

The inactive_list[0] is scanned in the first round;
the inactive_list[0] is scanned in the second round;
the inactive_list[0] is scanned in the third round;
the inactive_list[0] is scanned in the fourth round;
the inactive_list[0] and the inactive_list[1] are scanned in the fifth round;
the inactive_list[0] and the inactive_list[1] are scanned in the sixth round;
the inactive_list[0] and the inactive_list[1] are scanned in the seventh round;
the inactive_list[0], the inactive_list[1] and the inactive_list[2] are scanned in the eighth round;
the inactive_list[0], the inactive_list[1] and the inactive_list[2] are scanned in the ninth round; and
the inactive_list[0], the inactive_list[1], the inactive_list [2] and the inactive_list[3] are scanned in the tenth round.

It can be learned from the above that after the ten rounds of scanning (P=10), all the physical pages in the inactive_list [0] to the inactive_list[3] have been scanned once. Further, the inactive_list[0] are scanned ten times, the inactive_list [1] are scanned sixth times, the inactive_list[2] are scanned three times, and the inactive_list[3] are scanned once.

Further, the four inactive_lists shown in FIG. 4 is stilled used as an example, and the inactive_list[0] being a list with a smallest quantity of times of physical page access is used as an example.

The inactive_list[0] is scanned in the first round;
the inactive_list[0] is scanned in the second round;
the inactive_list[0] is scanned in the third round;
the inactive_list[0] is scanned in the fourth round;
the inactive_list[0] and the inactive_list[1] are scanned in the fifth round;
the inactive_list[0] and the inactive_list[1] are scanned in the sixth round;
the inactive_list[0], the inactive_list[1] and the inactive_list[2] are scanned in the seventh round; and
the inactive_list[0], the inactive_list[1], the inactive_list [2] and the inactive_list[3] are scanned in the eighth round.

It can be learned from the above that after the eight rounds of scanning (P=8), all the physical pages in the inactive_list [0] to the inactive_list[3] have been scanned at least once. Further, the inactive_list[0] are scanned eight times, the inactive_list[1] are scanned four times, the inactive_list[2] are scanned twice, and the inactive_list[3] are scanned once.

It should be noted that other rules that may be thought of by a person in the art may also be used to scan n inactive_lists, so that in the inactive_lists, physical pages that are accessed more times are scanned a smaller quantity of times, and physical pages that are accessed a smaller quantity of times are scanned more times, which is not specifically limited in the embodiment of this application.

1. A process of reclaiming physical pages by the operating system is described with reference to the accompanying drawings.

When allocating physical pages for application processes, the operating system puts the allocated physical pages into LRU lists, that is, the operating system puts the allocated physical pages into corresponding active_lists or inactive_lists based on a scenario. Then, when reclaiming the physical pages, the operating system scans the physical pages in the active_lists or n inactive_lists based on certain rules and performs reclaim check, moves the physical pages in the active_lists or the n inactive_lists, and determines reclaimable physical pages from the tail of the inactive_list [0] for reclaiming.

In an example, the operating system checks a page identifier PG_active of a physical page, and PG_active is used to identify an active degree of the physical page.

If PG_active is set (the value is 1), it indicates that the physical page is active. The operating system invokes, for example, lru_cache_add_active( ) to put the physical page into the active_list. In this case, the state of the physical page is [1,0], that is, PG_active=1, and PG_referenced=0. PG_referenced is used to identify whether the physical page has been accessed within the recent first preset period. Its role is described below. If PG_active is not set (the value is 0), it indicates that the physical page is not active. Then the operating system invokes, for example, lru_cache_add ( ) to put the physical page into a corresponding inactive_list[k] based on the numeric value of mapcount of the physical page, where k is an integer greater than or equal to 0 and less than or equal to n. In this case, the state of the physical page is [0,0], that is, PG_active=0, and PG_referenced=0.

In Linux, the operating system reclaims physical pages mainly by direct reclaim and reclaim by kswapd (a background process). The direct reclaim is triggered by a "severely out of memory" event. The operating system may invoke a function try_to_free_pages( ) to check physical pages in the current memory zone (inactive_lists and active_lists), and reclaim the least frequently used physical pages. Reclaim by kswapd means that the operating system periodically runs the kswapd process. Once it is detected that the memory is insufficient, a physical page reclaiming operation is triggered. Its entry function is balance_pgdat( ). It should be noted that the memory management method in the embodiment of this application is applicable to a reclaim operation triggered in any manner.

Continuing to refer to FIG. 4, after the operating system is triggered to perform the reclaim operation, the operating system can scan each inactive_list based on the foregoing scanning manner, and perform reclaim check on the scanned physical pages. If it is checked that a physical page has been accessed recently, the physical page is moved into the active_list (for example, moved to the head of the active_list), and if it is checked that a physical page has not been accessed recently, the physical page is reclaimed.

For example, when a physical page A at the tail of the inactive_list[0] is scanned, a check_referenced( ) function may be invoked to check the value of the page identifier PG_referenced of the physical page A. PG_referenced is used to identify whether the physical page has been accessed within the recent first preset period. When the value of PG_referenced is 1, it means that the physical page A has been accessed in the recent first preset period. When the value of PG_referenced is 0, it means that the physical page A has not been accessed in the recent first preset period.

If a return value of the function is 1, it means that the value of PG_referenced is 1, and then the physical page A may be moved to the head of the active_list. Specifically, the operating system may invoke a mark_page_accesed operation to set the page identifier PG_active of the physical page A to 1, and move the physical page A to the active_list. In this case, the state of the physical page A may be recorded as [1,1], that is, PG_active=1, and PG_referenced=1. It should be noted that if the physical page A has not been accessed again within a preset period, the value of PG_referenced will be cleared to 0. In this case, the state of the physical page A is changed to [1,0], that is, PG_active=1, and PG_referenced=0.

If a return value of the function is 0, it means that the value of PG_referenced is 0, and then the physical page A may be reclaimed. It should be noted that there may be some differences in the reclaiming process based on the nature of data cached in the physical page A. For example, if the data in the physical page A is for caching only, that is, the data may be recovered from an external memory, the physical page A may be directly released. If the data in the physical page A cannot be recovered, first the data in the physical page A needs to be swapped into a swap partition before releasing the physical page A.

For another example, when a physical page B at the tail of the inactive_list[k] is scanned, a method the same as the method for processing the physical page A may still be used. If the physical page B has been accessed within the recent first preset period, the physical page is moved to the active_list, otherwise it is reclaimed.

It should be noted that the operating system performs the same reclaim check and processing after the reclaim check on different inactive_lists. The operating system scans the physical pages in different inactive_list only in different cycles, so that cycles of reclaim check are also different, and the quantities of times of reclaim check are also different.

In addition, if the ratio of the total quantity of physical pages in the n inactive_lists to the total quantity of physical pages in the active_lists is lower than a threshold, the operating system scans the physical pages in the active_lists and moves physical pages unused in the recent first preset period to the corresponding inactive_lists, so that the operating system can reclaim the physical pages from the tails of the n inactive_lists.

Continuing to refer to FIG. 4, scanning is performed from the tail of the active_list, and reclaim check is performed on the scanned physical pages. If it is checked that a physical page C has been accessed recently, the physical page C is moved to the head of the active_list. In this case, the state of the physical page C is [1,1], that is, PG_active=1, and PG_referenced=1. If it is checked that the physical page C has not been accessed recently, the physical page C is moved to the inactive_list corresponding to the mapcount value of the physical page C, for example, to the head of the inactive_list[k]. In this case, the state of the physical page C is [0,0], that is, PG_active=0, and PG_referenced=0. In some examples, the mapcount value may be very large, or the physical page C may alternatively be moved to the inactive_list corresponding to log2(page→mapcount( )). page→mapcount( ) is used to represent the value of mapcount of the physical page C. A method for reclaim check is the same as the method for reclaim check on physical pages in the inactive_list, and is not described in detail herein.

In conclusion, a plurality of inactive_lists are obtained through division based on how frequently inactive physical pages are actually accessed, and different scanning cycles are adopted for different inactive_lists, so that the quantity of times frequently accessed physical pages are scanned is reduced, and the quantity of times of reclaim check on the frequently accessed physical pages is also correspondingly reduced.

On one hand, this reduces reclaim check of a frequently accessed physical page, reduces the probability that the physical page is reclaimed, which is equivalent to prolonging the survival time of the frequently accessed physical page, thereby increasing the cache hit rate of the memory and improving the reading and writing performance of the operating system. On the other hand, performing reclaim check on the frequently accessed physical page by using a larger cycle is conducive to finding during the reclaim check that the physical page has been accessed within the recent first preset period, so that the physical page is moved from the inactive_list to the active_list, and the survival time of the frequently accessed physical page is prolonged, thereby increasing the cache hit rate of the memory and improving the reading and writing performance of the operating system.

In some examples of this embodiment, the foregoing frequently accessed inactive pages may be, for example, physical pages shared by a plurality of application processes, and may specifically be part of basic library files shared by a plurality of application processes.

In the prior art, a memory locking (memory locking, mlock) method may be adopted to lock some basic library files shared by a plurality of application processes in the memory, so as to avoid frequently reclaiming physical pages where the shared basic files are located, and increase the cache hit rate of the memory. However, it should be noted that in the mlock method, an entire file is usually locked in the memory, which has at least two shortcomings. First, based on the limitation principle, data accessed by a CPU is usually concentrated in a certain continuous zone, that is, only a part of the file that is locked in the memory is frequently accessed. However, when the entire file is locked in the memory, the infrequently accessed content in the file occupies the memory space for a long time, resulting in a waste of the memory space. Second, once the mlock method is adopted to lock the entire file in the memory, even if the file is no longer accessed or frequently accessed subsequently, the operating system does not reclaim the physical pages where the file is located, resulting in a waste of the memory space.

However, in the embodiment of this application, mapcount is used to determine a physical page shared by a plurality of application processes, and then the reclaim check is still used to determine whether the shared physical pages have been accessed within the recent first preset period. If the shared physical pages have been accessed, the physical pages are retained in the memory. If the shared physical pages have not been accessed, the physical pages may be reclaimed. It can be learned that in this application, the data shared by a plurality of application processes is determined by using the physical page as the unit, so as to avoid retaining the data of the entire shared file in the memory. In addition, in this application, reclaim check is still performed on shared physical pages, and physical pages that are no longer frequently accessed are reclaimed. Compared with the memory locking method in the prior art, the memory management method according to the embodiment of this application increases the cache hit rate of the memory, and also increases the utilization rate of the memory.

Figure 5:
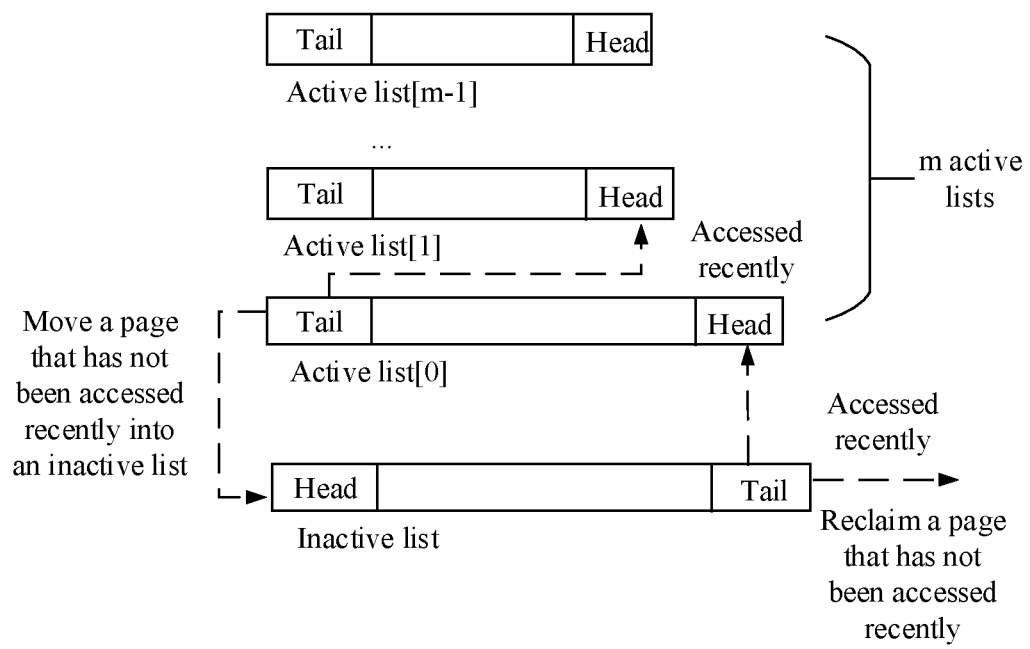
FIG. 5 is a schematic process diagram of another memory management method according to an embodiment of this application.

In some other embodiments, as shown in FIG. 5, the operating system may use one inactive_list and m active_lists for each memory zone to implement the function of reclaiming physical pages. m is an integer greater than or equal to 2. The quantity m of the active_lists in this embodiment may be the same as or different from the quantity n of inactive_lists in the foregoing embodiment.

1. The division basis of different active_lists are described first, and different reclaim check cycles are adopted for different active_lists.

To facilitate distinguishing between different active_lists, an active_list[i] is used to represent an $i^{th}$ active_list herein, that is, an i value represents an index value or an identifier of the active_list. In this application, n active_lists are obtained through division based on the number of times the physical pages are accessed. That is, the quantity of times the physical pages stored in the active_list[1] are accessed is positively correlated or inversely correlated with the size of the i value in the active_list[i].

It should be noted that the m active_lists are obtained through division herein to facilitate subsequent separate use of different scanning cycles and reclaim cycles for the m active_lists. Therefore, they may be m active_lists obtained through logical division, that is, the m active_lists are not necessarily physically separated.

For example, m active_lists may be obtained through division based on the quantity of times physical pages are accessed in a recent second preset period, so that the quantity of times physical pages stored in the active_list[i] are accessed in the recent second preset period are positively correlated or inversely correlated with the i value. For example, a larger quantity of times the physical pages stored in the active_list[i] are accessed indicates a larger i value or a smaller i value.

With m=4, the quantity of times the physical pages stored in the active_list[i] are accessed in the recent second preset period is positively correlated with the size of the i value as an example.

For example, Table 4 shows a correspondence between the quantity of times a physical page is accessed in the recent second preset period and an active_list[i].

TABLE 4

| Quantity of times a physical page is accessed in the recent second preset period | Corresponding active_list[i] |
|---|---|
| Quantity of times a physical page is accessed in the recent second preset period = 1 | active_list[0] |
| Quantity of times a physical page is accessed in the recent second preset period = 2 | active_list[1] |
| Quantity of times a physical page is accessed in the recent second preset period = 3 | active_list[2] |
| Quantity of times a physical page is accessed in the recent second preset period ≥ 4 | active_list[3] |

That is, when the quantity of times a physical page is accessed in the recent second preset period is 1, the physical page is put in the active_list[0]; when the quantity of times a physical page is accessed in the recent second preset period is 2, the physical page is put in the active_list[1]; when the quantity of times a physical page is accessed in the recent second preset period is 3, the physical page is put in the active_list[2]; and when the quantity of times a physical page is accessed in the recent second preset period is greater than or equal to 4, the physical page is put in the active_list [3].

It should be noted that the quantity of times a physical page is accessed in the recent second preset period may be judged as follows: when the physical page has just been added to an LRU list, or moves from an inactive_list to an active_list in the LRU list, it may be considered that the physical page is accessed for the first time in the recent second preset period, that is, the physical page is added to the active_list[0]. Then, when the physical page moves in a plurality of active_lists, the active_list to which the physical page is added may be determined based on the index value of the active_list in which the physical page is located and whether the physical page has been accessed within the recent first preset period, that is, the index value of the active_list to which the physical page is newly added is determined. The duration of the first preset period is usually smaller than that of the second preset period.

That is, it is assumed that the physical page is located in the active_list[k], and when k is less than m-1, if it is determined that the physical page has been accessed in the recent first preset period, the physical page is added to the active_list[k+1]. When k=m-1, that is, the physical page is located in the active_list[m-1], if it is determined that the physical page has been accessed in the recent first preset period, the physical page is retained in the active_list[m-1].

It can be learned that, the quantity of times the physical page in the active_list[0] is accessed <the quantity of times the physical page in the active_list[1] is accessed <the quantity of times the physical page in the active_list[2] is accessed <the quantity of times the physical page in the active_list[3] is accessed.

For example, Table 5 shows another correspondence between the quantity of times a physical page is accessed in the second preset period and an active_list[i].

TABLE 5

| Quantity of times a physical page is accessed in the recent second preset period | Corresponding active_list[i] |
|---|---|
| Quantity of times a physical page is accessed in the recent second preset period = 1, 2 | active_list[0] |
| Quantity of times a physical page is accessed in the recent second preset period = 3, 4 | active_list[1] |
| Quantity of times a physical page is accessed in the recent second preset period = 5, 6 | active_list[2] |
| Quantity of times a physical page is accessed in the recent second preset period ≥ 7 | active_list[3] |

It can be learned that, the quantity of times the physical page in the active_list[0] is accessed <the quantity of times the physical page in the active_list[1] is accessed <the quantity of times the physical page in the active_list[2] is accessed <the quantity of times the physical page in the active_list[3] is accessed. For other contents, reference may be made to the description in Table 4.

For another example, Table 6 shows still another correspondence between the quantity of times a physical page is accessed in the second preset period and an active_list[i].

TABLE 6

| Quantity of times a physical page is accessed in the recent second preset period | Corresponding active_list[i] |
|---|---|
| Quantity of times a physical page is accessed in the recent second preset period = 1 | active_list[0] |
| Quantity of times a physical page is accessed in the recent second preset period = 2, 3 | active_list[1] |
| Quantity of times a physical page is accessed in the recent second preset period = 4, 5, 6 | active_list[2] |
| Quantity of times a physical page is accessed in the recent second preset period ≥ 7 | active_list[3] |

It can be learned that, the quantity of times the physical page in the active_list[0] is accessed <the quantity of times the physical page in the active_list[1] is accessed <the quantity of times the physical page in the active_list[2] is accessed <the quantity of times the physical page in the active_list[3] is accessed. For other contents, reference may be made to the description in Table 4.

In conclusion, in the embodiment of this application, no limitation is imposed on a specific correspondence between the quantity of times a physical page is accessed in the recent second preset period and the active_list[i], provided that the quantity of times the physical page is accessed in the recent second preset period is roughly positively correlated or inversely correlated with the i value in the active_list[i].

When the operating system performs a reclaim operation on physical pages, if the ratio of the total quantity of physical pages in the inactive_lists to the total quantity of physical pages in m active_lists is lower than a threshold, the operating system scans the physical pages in the m active_lists and moves physical pages unused in the recent first preset period to the inactive_lists, so as to reclaim from the inactive_lists the physical pages unused in the recent first preset period. In this application, the scanning cycle of the active_list (hereinafter referred to as the frequently accessed active_list) storing frequently accessed physical pages may be prolonged, and then the cycle of reclaim check on the physical pages in the frequently accessed active_list may be prolonged, so as to prolong the cycle of reclaim check on frequently accessed physical pages, and reduce the quantity of times of reclaim check on the frequently accessed physical pages. That is, a larger quantity of times the physical pages are accessed indicates a longer corresponding scanning cycle and a longer corresponding cycle of reclaim check.

Using Table 4 as an example, it is learned based on the foregoing analysis that, the quantity of times the physical page in the active_list[0] is accessed <the quantity of times the physical page in the active_list[1] is accessed <the quantity of times the physical page in the active_list[2] is accessed <the quantity of times the physical page in the active_list[3] is accessed. Then, the scanning cycle of each active_list may be set as follows: scanning cycle of active_list[0]>scanning cycle of active_list[1]>scanning cycle of active_list[2]>scanning cycle of active_list[3].

In general, Q rounds of scanning may be performed on m active_lists, and active_lists with a larger quantity of times of access are added based on certain rules during each round of scanning. Q is greater than or equal to 2. In this way, in Q rounds of scanning, all physical pages in the m active_lists have been scanned at least once, and active_lists with a smaller quantity of times of access participate in more rounds of scanning than active_lists with a larger quantity of times of access. Two specific solutions, solution 3 and solution 4, are given as an example below.

Solution 3: Scanning is performed from the tail of an active_list with a smallest quantity of times of access, and a specific number (for example, 1) of active_lists with a larger quantity of times of access are added during each round of scanning.

The specific scanning solution is similar to solution 1, and is not described in detail herein.

Solution 4: Scanning is performed from the tail of an active_list with a smallest quantity of times of access, and a specific quantity of active_lists with a larger quantity of times of access are added during one round of scanning after a preset quantity of rounds of scanning.

The specific scanning solution is similar to solution 2, and is not described in detail herein.

It should be noted that other rules that may be thought of by a person in the art may also be used to scan m active_lists, so that in the active_lists, physical pages that are accessed more times are scanned a smaller quantity of times, and physical pages that are accessed a smaller quantity of times are scanned more times, which is not specifically limited in the embodiment of this application.

2. A process of reclaiming physical pages by the operating system is described with reference to the accompanying drawings.

When allocating physical pages for application processes, the operating system puts the allocated physical pages into LRU lists, that is, the operating system puts an allocated physical page into corresponding active_list[0] or inactive_list based on a scenario. Then, when reclaiming the physical pages, the operating system scans the physical pages in m active_lists or the inactive_lists based on certain rules and performs reclaim check, moves the physical pages in the m active_lists or the inactive_lists, and determines reclaimable physical pages from the tail of the inactive_list for reclaiming.

Continuing to refer to FIG. 5, after the operating system is triggered to perform the reclaim operation, the operating system scans inactive_lists, and performs reclaim check on the scanned physical pages. If it is checked that a physical page has been accessed recently, the physical page is moved into the active_list[0] (for example, moved to the head of the active_list[0]). In this case, the state of the physical page is [1,1], that is, PG_active=1, and PG_referenced=1. If it is checked that a physical page has not been accessed recently, the physical page is reclaimed. For a method for reclaim check and a method for reclaiming physical pages, reference may be made to the description of the foregoing embodiment, and details are not described herein again.

If the ratio of the total quantity of physical pages in the inactive_lists to the total quantity of m physical pages in the active_lists is lower than a threshold, the operating system scans the physical pages in the m active_lists based on the foregoing scanning solution (such as solution 3 or solution 4) from the active_list[0] and moves physical pages unused in the recent first preset period to the inactive_lists, so that the operating system can reclaim the physical pages from the tails of the inactive_lists.

Continuing to refer to FIG. 5, when the physical page D in the active_list[k] is scanned, and when k is greater than or equal to 0 and less than m-1, reclaim check is performed on the physical page D. If it is checked that a physical page D has been accessed recently, the physical page D is moved into the head of the active_list[k+1]. In this case, the state of the physical page D is [1,1], that is, PG_active=1, and PG_referenced=1. If it is checked that the physical page D has not been accessed recently, the physical page D is moved to the inactive_list, for example, to the head of the inactive_list. In this case, the state of the physical page D is [0,0], that is, PG_active=0, and PG_referenced=0.

When k=m-1, that is, when a physical page E in the active_list[m-1] is scanned, reclaim check is performed on the physical page E. If it is checked that a physical page E has been accessed recently, the physical page is put into the head of the active_list[m-1]. If it is checked that the physical page E has not been accessed recently, the physical page E is moved to the inactive_list, for example, to the head of the inactive_list.

It should be noted that the operating system performs the same reclaim check and processing after the reclaim check on different active_lists. The operating system scans the physical pages in different active_list only in different cycles, so that the quantities of times of reclaim check are also different.

In conclusion, a plurality of active_lists are obtained through division based on how frequently active physical pages are actually accessed, and different scanning cycles are adopted for different active_lists, so that the quantity of times frequently accessed physical pages are scanned is reduced, and the quantity of times of reclaim check on the frequently accessed physical pages is also correspondingly reduced. This avoids unnecessary reclaim and check of a frequently accessed physical page for many times, accelerates reclaim efficiency of an operating system on a physical page, and improves the performance of the operating system.

Figure 6:
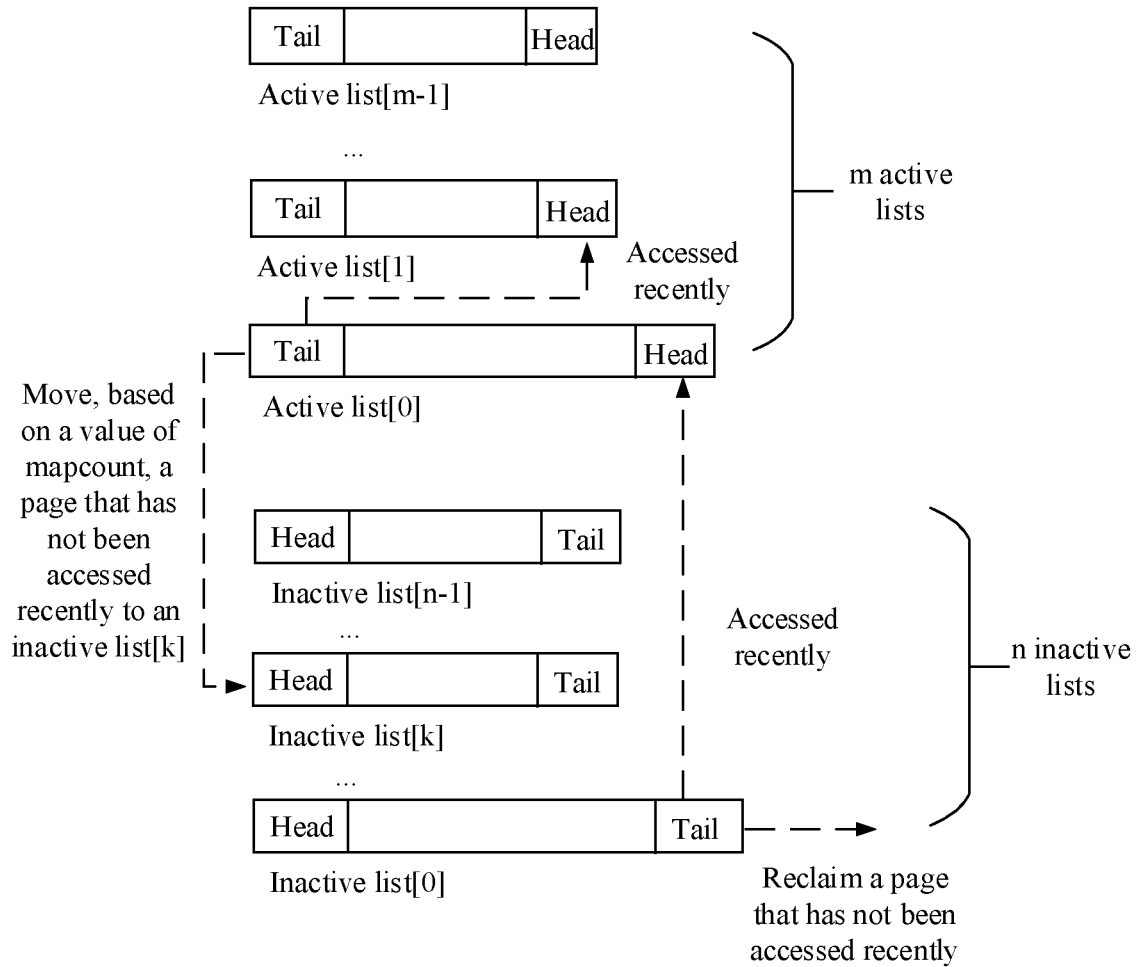
FIG. 6 is a schematic process diagram of still another memory management method according to an embodiment of this application.

In some still other embodiments, as shown in FIG. 6, the operating system may use n inactive_lists and m active_lists for each memory zone to implement the function of reclaiming physical pages.

For a division method and a scanning solution for n inactive_lists and a division method and a scanning solution for m active_lists, reference may be made to the foregoing embodiment, and details are not described herein again.

For example, when allocating physical pages for application processes, the operating system puts the allocated physical pages into LRU lists, that is, the operating system puts an allocated physical pages into a corresponding active_list[0] based on a scenario, or the physical page is put in the corresponding inactive_list[k] with reference to the value of mapcount of the physical page.

Subsequently, when performing an operation of reclaiming physical pages, the operating system scans physical pages in n inactive_lists based on the foregoing scanning solution (such as solution 1 or solution 2) and performs reclaim check. If it is checked that a scanned physical page has been accessed within the recent first preset period, the physical page is moved into the active_list[0]. If it is checked that a scanned physical page has not been accessed within the recent first preset period, the physical page may be reclaimed.

If the ratio of the total quantity of physical pages in the n inactive_lists to the total quantity of physical pages in the m active_lists is lower than a threshold, the operating system scans the physical pages in the m active_lists and moves physical pages unused in the recent first preset period to the corresponding inactive_list[k], so that the operating system can reclaim the physical pages from the tails of the n inactive_lists.

The operating system scans physical pages in m active_lists based on the foregoing scanning solution (such as solution 3 or solution 4) and performs reclaim check. For example, when a physical page in the active_list[k] is scanned and k is not equal to m-1, if it is checked that the physical page has been accessed in the recent first preset period, the physical page is moved into the active_list[k+1]. If it is checked that a physical page has not been accessed within the recent first preset period, the physical page is moved into the corresponding inactive_list based on the value of mapcount of the physical page. When k is equal to m-1, that is, when a physical page in the active_list[m-1] is scanned, if it is checked that the physical page has been accessed in the recent first preset period, the physical page is moved into the head of the active_list[m-1]. If it is checked that a physical page has not been accessed within the recent first preset period, the physical page is moved into the corresponding inactive_list based on the value of mapcount of the physical page.

The prior art (one memory zone is corresponding to one active_list and one inactive_list) and the method according to this application (one memory zone is corresponding to four active_lists and four inactive_lists) were separately used to perform a tarus test on a startup scenario of TOP40 applications in the current market. A test has shown that the quantities of times of reading a magnetic disk in a system partition and a data partition were reduced by 3.3% and 3.9%, respectively, which means that the cache hit rate of the memory is improved. In addition, the startup time of the applications is shown in Table 7 as follows:

TABLE 7

| Index | Average startup time (ms) | Time of startup for the first time (ms) | Average cold start time (ms) | Average hot startup time (ms) |
| --- | --- | --- | --- | --- |
| Prior art | 0.803 | 0.854 | 0.906 | 0.562 |
| Method according to this application | 0.781 | 0.846 | 0.868 | 0.352 |
| Optimized by | 2.7% | 1.0% | 4.2% | 37.3% |

It can be learned that the method according to the embodiment of this application effectively improves the reading and writing performance of the operating system and accelerates a running speed of applications.

Figure 7:
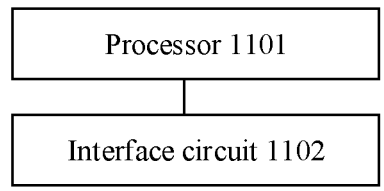
FIG. 7 is a schematic structural diagram of a chip system according to an embodiment of this application.

An embodiment of this application further provides a chip system. As shown in FIG. 7, the chip system includes at least one processor 1101 and at least one interface circuit 1102. The processor 1101 and the interface circuit 1102 may be interconnected by a line. For example, the interface circuit 1102 may be configured to receive a signal from another apparatus (such as a memory of the electronic device 100). For another example, the interface circuit 1102 may be configured to send a signal to another apparatus (for example, the processor 1101). For example, the interface circuit 1102 can read an instruction stored in the memory, and send the instruction to the processor 1101. When the instruction is executed by the processor 1101, the electronic device is enabled to perform various steps performed by the electronic device 100 (for example, a mobile phone) in the foregoing embodiments. Certainly, the chip system may further include other discrete devices, which are not specifically limited herein in the embodiments of this application.

It may be understood that, to implement the foregoing functions, the foregoing terminal and the like include corresponding hardware structures and/or software modules for performing the functions. A person skilled in the art should be easily aware that, with reference to the units and algorithm steps described in the embodiments disclosed in this specification, the embodiments of this application can be implemented in a form of hardware or hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of the present invention.

In the embodiments of this application, the foregoing terminal and the like may be divided into functional modules based on the foregoing method examples. For example, each functional module may be obtained through division for a corresponding function, or two or more functions may be integrated into one processing module. The integrated modules may be implemented in a form of hardware, or may be implemented in a form of a software function module. It should be noted that module division in the embodiments of the present invention is an example, and is merely logical function division. In actual implementation, there may be another division manner.

The foregoing descriptions about implementations allow a person skilled in the art to clearly understand that, for the purpose of convenient and brief description, division of the foregoing functional modules is used only as an example for illustration. In actual application, the foregoing functions can be allocated to different functional modules and implemented as required, that is, an inner structure of an apparatus is divided into different functional modules to implement all or some of the functions described above. For the specific operating processes of the system, apparatus and units described above, reference may be made to the corresponding processes in the above-mentioned method embodiments. Details are not described herein again.

Functional units in the embodiments of this application may be integrated into one processing unit, or each of the units may exist alone physically, or two or more units may be integrated into one unit. The integrated unit may be implemented in a form of hardware, or may be implemented in a form of a software function unit.

The integrated units may be stored in one computer readable storage medium if implemented in the form of a software function unit and sold or used as a standalone product. Based on such understanding, the technical solution of the embodiment of this application which is essential or a part contributing to the prior art or all or a part of the technical solution may be embodied in the form of a software product, and the computer software product is stored in a storage medium and includes several instructions for enabling a computer device (which may be a personal computer, a server or a network device) for a processor to perform all or some steps of the method according to each embodiment of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement made within the technical scope disclosed in this application shall fall within the protection scope of this application. Therefore, the protection scope of this application shall be subject to the protection scope of the claims.

What is claimed is:

1. An electronic device, comprising:
a processor;
a touchscreen coupled to the processor; and
a memory coupled to the processor, wherein the memory comprises one or more memory zones, wherein each of the one or more memory zones corresponds to n inactive lists and m active lists, wherein n is an integer greater than 1, wherein m is an integer greater than or equal to 1, and wherein the memory is configured to store computer program code containing instructions that, when executed by the processor, cause the electronic device to be configured to:
put, based on a quantity of mappings to each of a plurality of inactive physical pages by application processes, each of the plurality of inactive physical pages, allocated by the electronic device, into a corresponding inactive list among the n inactive lists;
during a process of reclaiming one or more of the plurality of inactive physical pages by the electronic device:
scan each of the n inactive lists; and
perform a reclaim check on respective inactive physical pages, of the plurality of inactive physical pages, in each of the n inactive lists, wherein a scanning cycle, of a respective inactive list of the n inactive lists, is based on the quantity of mappings to each of the plurality of inactive physical pages by the application processes;

reclaim the one or more of the plurality of inactive physical pages when the one or more of the plurality of inactive physical pages in the n inactive lists have not been accessed in a recent preset period; and move the one or more of the plurality of inactive physical pages to the m active lists when the one or more of the plurality of inactive physical pages in the n inactive lists have been accessed in the recent preset period.

2. The electronic device of claim 1, wherein scanning each of the n inactive lists comprises:

sequencing the n inactive lists based on the quantity of mappings to each of the plurality of inactive physical pages by the application processes; and during the process of reclaiming the plurality of inactive physical pages by the electronic device, performing P rounds of scanning on the n inactive lists, wherein P is an integer greater than or equal to 2, wherein in each of the P rounds of scanning, based on a sequence of the n inactive lists, scanning is performed from an inactive list, of the n inactive lists, in which a physical page, of the plurality of inactive physical pages, with a smallest quantity of mappings, of the quantity of mappings to each of the plurality of inactive physical pages, is located, and wherein a quantity of the n inactive lists scanned in each round is different.

3. The electronic device of claim 2, wherein the quantity of inactive lists, scanned in each of the rounds, increases by a present quantity.

4. The electronic device of claim 1, wherein the instructions, when executed by the processor, further cause the electronic device to be configured to:

scan from one side of an active list, of the m active lists, and perform a reclaim check on scanned physical pages when m is equal to 1 and during the process of reclaiming the one or more of the inactive physical pages by the electronic device;

put a physical page into an inactive list, of the n inactive lists, corresponding to a quantity of mappings, of the quantity of mappings to each of the plurality of inactive physical pages, to the physical page by the application processes when the physical page, in the active list, has not been accessed in the recent preset period; and move the physical page to an other side of the active list when the physical page in the active list has been accessed in the recent preset period.

5. The electronic device of claim 1, wherein the instructions, when executed by the processor, further cause the electronic device to be configured to, when m is greater than 1, put an active physical page allocated by the electronic device into a corresponding active list among the m active lists based on a quantity of times the active physical page is accessed.

6. The electronic device of claim 5, wherein moving the one or more of the inactive physical pages to the m active lists comprises moving, when the one or more of the inactive physical pages have been accessed in the recent preset period, the one or more of the inactive physical pages to an active list, with a smallest quantity of times that a physical page is accessed, among the m active lists.

7. The electronic device of claim 5, wherein the instructions, when executed by the processor, further cause the electronic device to be configured to:

during the process of reclaiming the one or more of the inactive physical pages by the electronic device, scan the m active lists, and perform reclaim check on physical pages in the m scanned active lists;

when the physical pages, in the m active lists, have not been accessed in the recent preset period, put each of the physical pages into an inactive list, of the n inactive lists, corresponding to quantity of mappings to each of the physical pages by the application processes; and move a physical page from a first active list, among the m active lists, to a second active list, among the m active lists, when the physical page, in the first active list, has been accessed in the recent preset period, wherein a quantity of times the physical page is accessed in the second active list is greater than a quantity of times the physical page is accessed in the first active list.

8. The electronic device of claim 7, wherein scanning the m active lists comprises during the process of reclaiming the one or more of the inactive physical pages by the electronic device, performing Q rounds of scanning on the m active lists, wherein Q is an integer greater than or equal to 2, wherein in each of the Q rounds of scanning, based on a sequence of the m active lists, scanning is performed from an active list, of the m active lists, in which a first physical page, accessed a smallest quantity of times, is located, and a quantity of the m active lists scanned in each round is different.

9. The electronic device of claim 8, wherein the quantity of active lists, scanned in each of the rounds, increases by a preset quantity.

10. An electronic device, comprising:

a processor;

a touchscreen coupled to the processor; and a memory coupled to the processor, wherein the memory comprises one or more memory zones, wherein each of the one or more memory zones corresponds to one inactive list and m active lists, wherein m is an integer greater than 1, and wherein the memory is configured to store computer program code containing instructions that, when executed by the processor, cause the electronic device to be configured to:

put, based on a quantity of times each of a plurality of active physical pages is accessed, each of the plurality of active physical pages, allocated by the electronic device, into a corresponding active list among the m active lists;

during a process of reclaiming physical pages by the electronic device:

scan each of the m active lists; and perform a reclaim check on respective active physical pages, of the plurality of active physical pages, in each of the m scanned active lists, wherein a scanning cycle, of a respective active list of the m active lists, is based on a larger quantity of time a physical page is accessed in the respective active list;

move one or more of the plurality of active physical pages to one side of the inactive list when the one or more of the plurality of active physical pages, in the m active lists, have not been accessed in a recent preset period; and move a physical page from a first active list, among the m active lists, to a second active list, among the m active lists, when the physical page, in the first active list, has been accessed in the recent preset period, wherein a quantity of times the physical page is accessed in the second active list is greater than a quantity of times the physical page is accessed in the first active list.

11. The electronic device of claim 10, wherein scanning each of the m active lists comprises during the process of reclaiming the physical pages by the electronic device, performing Q rounds of scanning on the m active lists, wherein Q is an integer greater than or equal to 2, wherein in each of the Q rounds of scanning, based on a sequence of the m active lists, scanning is performed from an active list, of the m active lists, in which a first physical page, accessed a smallest quantity of times, is located, and a quantity of the m active lists scanned in each round is different.

12. The electronic device of claim 11, wherein the quantity of active lists, scanned in each of the rounds increases by a preset quantity.

13. The electronic device of claim 10, wherein the instructions, when executed by the processor, further cause the electronic device to be configured to:
   during the process of reclaiming the physical pages by the electronic device, scan from an other side of the inactive list, and perform a reclaim check on scanned physical pages;
   reclaim a first physical page when the first physical page in the inactive list has not been accessed in the recent preset period; and
   when the first physical page, in the inactive list, has been accessed in the recent preset period, move the first physical page from the inactive list to an active list, with a smallest quantity of times a second physical page is accessed, among the m active lists.

14. A non-transitory computer readable storage medium, comprising computer instructions that, when executed by a processor of a terminal, cause the terminal to be configured to:
   put, based on a quantity of mappings to each of a plurality of inactive physical pages by application processes, each of the plurality of inactive physical pages allocated by the terminal, into a corresponding inactive list among n inactive lists;
   during a process of reclaiming one or more of the plurality of inactive physical pages by the terminal:
      scan each of the n inactive lists; and
      perform a reclaim check on respective inactive physical pages, of the plurality of inactive physical pages, in each of the n inactive lists, wherein a scanning cycle, of a respective inactive list of the n inactive lists, is based on the quantity of mappings to each of the plurality of inactive physical pages by the application processes;
   reclaim the one or more of the plurality of inactive physical pages when the one or more of the plurality of inactive physical pages in the n inactive lists have not been accessed in a recent preset period; and
   move the one or more of the plurality of inactive physical pages to m active lists when the one or more of the plurality of inactive physical pages in the n inactive lists have been accessed in the recent preset period.

15. The non-transitory computer readable storage medium of claim 14, wherein n is an integer greater than 1 and wherein m is an integer greater than or equal to 1.

16. The non-transitory computer readable storage medium of claim 14, wherein scanning each of the n inactive lists comprises:
   sequencing the n inactive lists based on the quantity of mappings to each of the plurality of inactive physical pages by the application processes; and
   during the process of reclaiming the plurality of inactive physical pages by the terminal, performing P rounds of scanning on the n inactive lists, wherein P is an integer greater than or equal to 2, wherein in each of the P rounds of scanning, based on a sequence of the n inactive lists, scanning is performed from an inactive list, of the n inactive lists, in which a physical page, of the plurality of inactive physical pages, with a smallest quantity of mappings, of the quantity of mappings to each of the plurality of inactive physical pages, is located, and wherein a quantity of the n inactive lists scanned in each round is different.

17. The non-transitory computer readable storage medium of claim 16, wherein the quantity of inactive lists scanned in each of the rounds increases by a preset quantity.

18. The non-transitory computer readable storage medium of claim 14, wherein the instructions, when executed by the processor, further cause the terminal to be configured to:
   scan from one side of an active list, of the m active lists, and perform a reclaim check on scanned physical pages when m is equal to 1 and during the process of reclaiming the one or more of the inactive physical pages by the terminal;
   put a physical page into an inactive list, of the n inactive lists, corresponding to a quantity of mappings, of the quantity of mappings to each of the plurality of inactive physical pages, to the physical page by the application processes when the physical page, in the active list, has not been accessed in the recent preset period; and
   move the physical page to an other side of the active list when the physical page in the active list has been accessed in the recent preset period.

19. The non-transitory computer readable storage medium of claim 14, wherein the instructions, when executed by the processor, further cause the terminal to be configured to, when m is greater than 1, put an active physical page allocated by the terminal into a corresponding active list among the m active lists based on a quantity of times the active physical page is accessed.

20. The non-transitory computer readable storage medium of claim 19, wherein moving the one or more of the inactive physical pages to the m active lists comprises moving, when the one or more of the inactive physical pages have been accessed in the recent preset period, the one or more of the inactive physical pages to an active list, with a smallest quantity of times that a physical page is accessed, among the m active lists.

* * * * *

UNITED STATES PATENT AND TRADEMARK OFFICE
CERTIFICATE OF CORRECTION

| | |
|---|---|
| PATENT NO. | : 12,079,118 B2 |
| APPLICATION NO. | : 17/768655 |
| DATED | : September 3, 2024 |
| INVENTOR(S) | : Tao Wang and Qi Zhai |

It is certified that error appears in the above-identified patent and that said Letters Patent is hereby corrected as shown below:

In the Claims

Claim 14, Column 39, Line 27: "non-transitory computer readable storage" should read "non-transitory computer-readable storage"

Claim 15, Column 39, Line 54: "non-transitory computer readable storage" should read "non-transitory computer-readable storage"

Claim 16, Column 40, Line 1: "non-transitory computer readable storage" should read "non-transitory computer-readable storage"

Claim 17, Column 40, Line 20: "non-transitory computer readable storage" should read "non-transitory computer-readable storage"

Claim 18, Column 40, Line 23: "non-transitory computer readable storage" should read "non-transitory computer-readable storage"

Claim 19, Column 40, Line 41: "non-transitory computer readable storage" should read "non-transitory computer-readable storage"

Claim 20, Column 40, Line 48: "non-transitory computer readable storage" should read "non-transitory computer-readable storage"

Signed and Sealed this
Fifth Day of November, 2024

Katherine Kelly Vidal
*Director of the United States Patent and Trademark Office*